(12) United States Patent
Ohira et al.

(10) Patent No.: US 8,478,522 B2
(45) Date of Patent: Jul. 2, 2013

(54) MAP-UPDATING-DATA CREATING METHOD, AND MAP UPDATING METHOD AND APPARATUS

(75) Inventors: Masaaki Ohira, Tokyo (JP); Minoru Sekine, Tokyo (JP)

(73) Assignees: Alpine Electronics, Inc., Tokyo (JP); Mobilemedia Brain Association, Inc., Tokyo (JP)

( * ) Notice: Subject to any disclaimer, the term of this patent is extended or adjusted under 35 U.S.C. 154(b) by 776 days.

(21) Appl. No.: 12/124,600

(22) Filed: May 21, 2008

(65) Prior Publication Data

US 2009/0037490 A1 Feb. 5, 2009

Related U.S. Application Data

(62) Division of application No. 11/349,070, filed on Feb. 7, 2006, now Pat. No. 7,395,150.

(30) Foreign Application Priority Data

Feb. 10, 2005 (JP) ................... 2005-033911

(51) Int. Cl.
*G06F 17/00* (2006.01)
*G06F 7/00* (2006.01)
*G01C 21/32* (2006.01)
*G08G 1/123* (2006.01)

(52) U.S. Cl.
USPC ...... 701/450; 701/452; 701/461; 340/995.12; 340/995.18; 707/695; 707/918; 707/999.203

(58) Field of Classification Search
USPC ............... 701/200, 201, 206, 207, 208, 209, 701/210, 300, 400, 408, 409, 410, 420, 421, 701/430, 450, 451, 452, 461, 462, 468, 484, 486, 522, 532; 340/988, 995.1, 995.11, 995.12, 340/995.14, 995.15, 995.18; 707/2, 8, 100, 707/102, 634, 694, 695, 918, 999.002, 999.008, 707/999.2, 999.203

See application file for complete search history.

(56) References Cited

U.S. PATENT DOCUMENTS

| | | | |
|---|---|---|---|
| 6,075,467 A | 6/2000 | Ninagawa | 340/995.14 |
| 6,230,098 B1 | 5/2001 | Ando et al. | 701/208 |
| 6,546,334 B1 | 4/2003 | Fukuchi et al. | 701/208 |
| 6,553,511 B1 * | 4/2003 | DeKoning et al. | 714/6 |

(Continued)

FOREIGN PATENT DOCUMENTS

JP 2004-295207 10/2004

*Primary Examiner* — Thomas Tarcza
*Assistant Examiner* — Edward Pipala
(74) *Attorney, Agent, or Firm* — Brinks Hofer Gilson & Lione

(57) ABSTRACT

A map-updating-data creating apparatus performs, for each old map file, creating a map-updating file for rewriting the map file to a new map file, determining the serial number of each of the updated map files, creating a serial number management file in which marks are respectively written at positions corresponding to the serial numbers, and generating, as map-updating data, the map-updating file and the serial number management file. A navigation apparatus performs map-updating processing and determines, by referring to the serial number management file, whether a map file has already been updated. The navigation apparatus uses the map-updating file to execute navigation control if the map file has already been updated, and updates the map file and subsequently executes the navigation control if the map file has not been updated.

16 Claims, 21 Drawing Sheets

U.S. PATENT DOCUMENTS

| | | |
|---|---|---|
| 6,766,248 B2 * | 7/2004 | Miyahara .................... 701/208 |
| 2004/0083051 A1 | 4/2004 | Ohno et al. .................. 701/200 |
| 2004/0193370 A1 | 9/2004 | Umezu et al. |
| 2005/0159885 A1 * | 7/2005 | Nomura ....................... 701/208 |
| 2005/0203937 A1 | 9/2005 | Nomura ....................... 707/102 |

* cited by examiner

FIG. 6

| |
|---|
| NEW FILE: DATA A |
| OLD FILE: DESIGNATION (START ADDRESS OF DATA 1 + SIZE) OF DATA 1 |
| NEW FILE: DATA B |
| OLD FILE: DESIGNATION (START ADDRESS OF DATA 3 + SIZE) OF DATA 3 |
| NEW FILE: DATA C |
| OLD FILE: DESIGNATION (START ADDRESS OF DATA 2 + SIZE) OF DATA 2 |
| NEW FILE: DATA D |

FIG. 9
(A)
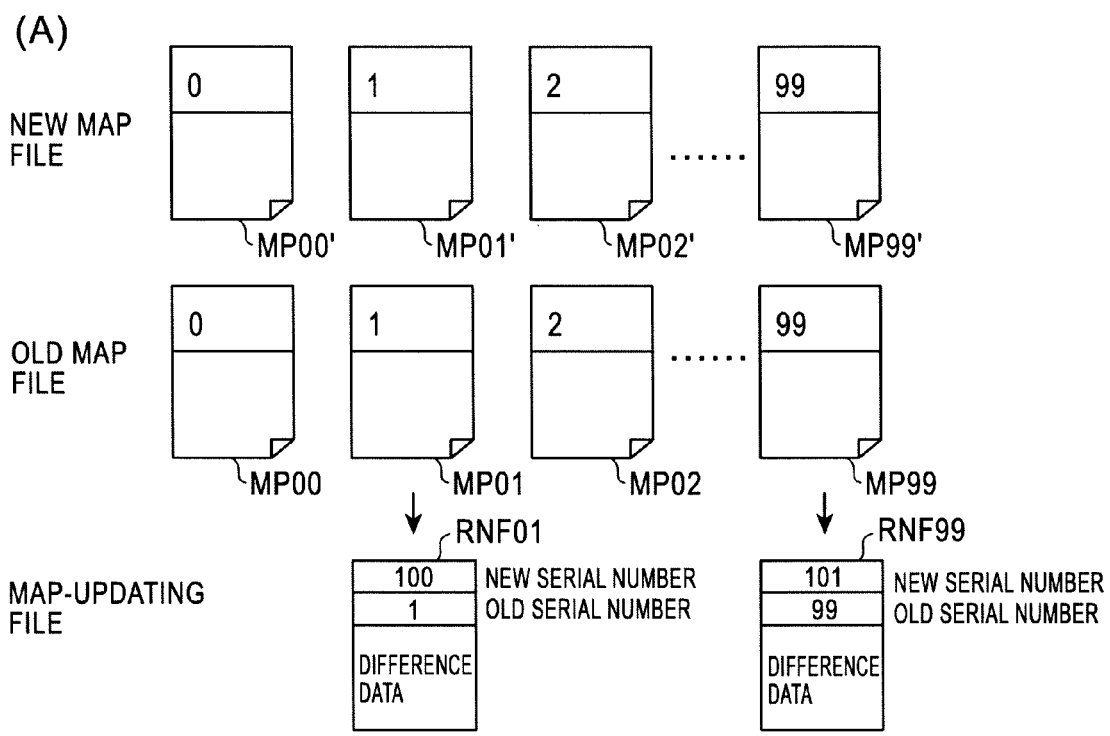
(B)
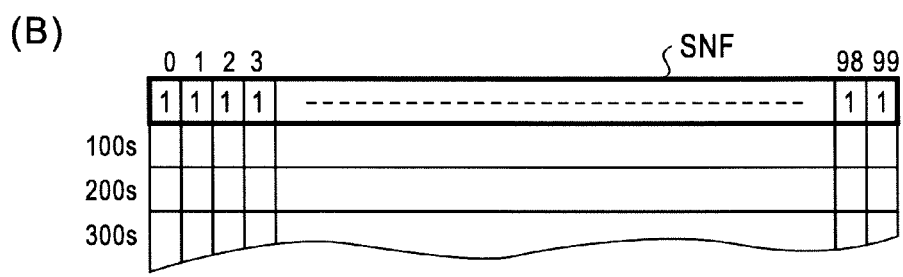
(C)
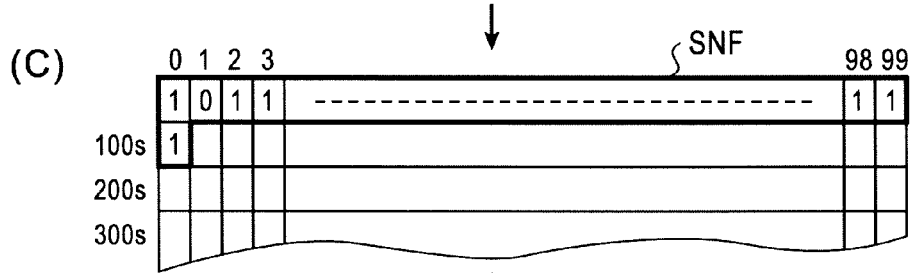
(D)
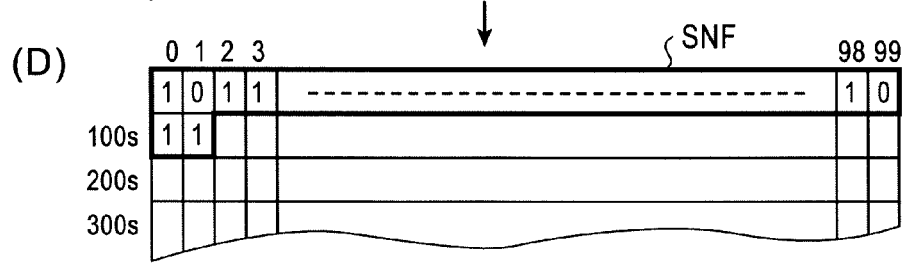

MAP-UPDATING-DATA CREATING METHOD, AND MAP UPDATING METHOD AND APPARATUS

CROSS-REFERENCE TO RELATED APPLICATIONS

This is divisional of and claims the benefit of priority from application Ser. No. 11/349,070, filed Feb. 7, 2006, entitled Map-Updating-Data Creating Method, And Map Updating Method And Apparatus, currently pending, and is hereby incorporated by reference in its entirety.

BACKGROUND OF THE INVENTION

1. Field of the Invention

The present invention relates to map-updating-data creating methods, and map updating methods and apparatuses, and in particular, to a method for creating map-updating data for use in map updating in the background while performing navigation control, and a map updating method and apparatus.

2. Description of the Related Art

A navigation apparatus reads, from a recording medium such as a CD-ROM (compact-disk read-only memory), a DVD (digital versatile disc), or a hard disk, map data corresponding to the present position of a vehicle, and draws the read map data to display a map on a display screen. In addition, the navigation apparatus fixedly displays a vehicle mark at a predetermined position, and scrolls the displayed map in accordance with traveling of the vehicle. The map data includes (1) a road layer including node data, road link data, and intersection data, (2) a background layer for displaying objects on the map, and (3) a character layer for displaying municipality names, etc. A map image displayed on the display screen is generated based on the background layer and the character layer, and map matching and guidance-route searching are performed on the basis of the road layer. Additionally, the navigation apparatus has a route guidance function which searches for a guidance route from a place of departure to a destination and which displays the guidance route on the map, and a personal computer display function that displays predetermined POI (place of interest) marks on the map.

The map data recorded on the recording medium becomes obsolete with time because of a topographic data changes due to construction of a new road, etc., opening and closure of facilities, housing/land improvement, and other reasons. Accordingly, a technology (see, for example, Japanese Unexamined Patent Application Publication No. 2003-337027) of the related art has been proposed in which updated map data is stored in units of regions in a nonvolatile memory of a navigation apparatus, and navigation control is performed such that a map of a region whose map data has been updated is read from the nonvolatile memory and a region whose map data has not been updated is read from a recording medium (such as a CD-ROM). This technology performs writing the latest map data of regions (blocks) obtained by performing updating in units of meshes from a removable memory to a nonvolatile memory such as a hard disk, and checking, by referring to block management information, whether updated map data of all the meshes, which form the blocks, are stored in the nonvolatile memory. If the updated map data is not stored in the nonvolatile memory, map information is read from a recording medium (such as a CD-ROM). If the updated map data is stored in the nonvolatile memory, the updated map data stored is read and used to perform navigation control. Since, in this technology, it is necessary to perform the navigation control by using both the recording medium, such a CD-ROM or DVD, and the nonvolatile memory such as a hard disk, this technology has a problem in that the navigation control is complicated. In addition, this technology constantly needs a map recording medium, such as a CD-ROM or DVD, for navigation control. Thus, it is required that a music CD player and a DVD player be provided separately from a map playback device, so that a problem occurs in that necessary hardware has a large size.

Accordingly, a method (see, for example, Japanese Unexamined Patent Application Publication Nos. 2004-287705 and 2001-165675) has been proposed in which map data is stored in a map storage unit such as a hard disk, and, when the map data is altered, the map data on the hard disk is rewritten by the latest map data.

In Japanese Unexamined Patent Application Publication No. 2004-287705, a user can update old map data on a hard disk to new map data by acquiring a difference between the old map data and the new map data from a center, or purchasing an updating DVD containing the difference between the old map data and the new map data. This makes it possible to perform navigation control by using the map data on the hard disk, and enables a music-listening and video-viewing DVD player to be used as a DVD for maps. In addition, music and video can be enjoyed while performing navigation control.

FIG. 20 is a schematic illustration of creation of an updating DVD by a map-difference-data creating apparatus (not shown).

Since map data includes a large number of files, the map-difference-data creating apparatus creates difference data items $DFD_1$ to $DFD_N$ by extracting, in units of files, a difference between old map file OFL in old version (version 1) and new map file NFL in new version (version 2). After that, the map-difference-data creating apparatus combines all the difference data items to create updating data, and creates an updating DVD 1 by writing the updating data in a DVD.

FIG. 21 is a block diagram showing an updating process of a navigation apparatus that uses the updating DVD 1 to update old map data on the hard disk to new map data. In the case of map updating, in the navigation apparatus, a hard disk (HD) reading unit 2 reads and inputs the old map file OFL in version 1 on a hard disk 3 to an updating unit 4, and a DVD playback unit 5 reads and inputs the difference data on the updating DVD 1 to the updating unit 4. The updating unit 4 creates the new map file in version 2 in units of files by using the difference data and the old map file OFL in version 1, and a hard disk (HD) writing unit 6 uses the new map file NFL to rewrite the old map file OLF.

In Japanese Unexamined Patent Application Publication No. 2001-165675, a map file to be updated and a map-updating date and time are recorded in a DVD-ROM. When a map file read from the DVD-ROM does not exist on the hard disk, the map file is written on the hard disk, and, when the map file exists, the map-updating dates and times of the map file read from the DVD-ROM and the map file on the hard disk are compared with each other. If the map-updating date and time of the map file on the hard disk is older, the map file on the hard disk is updated by using the map file read from the DVD-ROM.

However, the map updating in Japanese Unexamined Patent Application Publication No. 2004-287705 requires a long time of more than one or two hours. This is because time is taken by processing of creating a new map file based on an old map file and difference data and reading of the old map file. Accordingly, in the map updating, the vehicle needs to be left, with its engine running for the long time required for updating. Alternatively, after removing the hard disk, it is necessary to use a dedicated apparatus installed at a dealer to perform data rewriting for a long time. However, the map updating has a problem of inability to perform navigation control during the data rewriting.

In the map updating in Japanese Unexamined Patent Application Publication No. 2001-165675, although no use of difference data shortens the time required for the map updating compared with that in Japanese Unexamined Patent Application Publication No. 2004-287705, the amount of data is greater than that in the case of recording difference data since a map file to be updated is directly recorded on a DVD. Accordingly, all map files to be updated may not be recorded on a single DVD. The amount of map data at the present is approximately 15 gigabytes and the capacity of a DVD is 8.5 gigabytes. Thus, when more than half of the map files are altered, all the map files to be updated cannot be recorded on the single DVD. In this case, it is necessary to change DVDs during the map updating, so that a map updating operation is complicated. In addition, navigation control is impossible during the map updating.

In the technologies of the related art, disclosed in Japanese Unexamined Patent Application Publication Nos. 2004-287705 and 2001-165675, when updating old map data including a large number of map files, it is necessary to determine whether each map file has already been updated. In the above technologies, as shown in FIG. 22, a data version number (MT001) is assigned to map files $2_1$ to $2_N$, and the data version number of all the map files $2_1$ to $2_N$ is incremented from MT001 to MT002 whenever map updating is performed. By referring to the data version number, it is determined whether each map file is the latest. The above determination requires processing in which, even for each map file whose map data is not to be updated, the map file is read from the hard disk and its version number is rewritten before being written on the hard disk. When considering that hundred thousand map files exist, a problem of a very long map updating time occurs.

SUMMARY OF THE INVENTION

Accordingly, it is an object of the present invention to enable map updating while performing navigation control.

It is another object of the present invention that, when a map file necessary for navigation control is not updated, by prioritizing updating (updating in the background) of the map file, navigation control based on the latest map file can be performed.

It is another object of the present invention to enable easily determining whether or not a map file stored in a map storage unit of a navigation apparatus is the latest map file containing up-to-date map data (a map file that does not need to be rewritten or updated map file).

It is another object of the present invention that, even if, among map files stored in a map storage unit of a navigation apparatus, a map file that does not need to be updated is not particularly rewritten, it can be determined whether or not each map file is the latest.

According to a first aspect of the present invention, the above objects are achieved by a map-data-updating creating method and apparatus.

The map-updating-data creating method includes, for each old map file to be updated, creating a map-updating file for rewriting the old map file to a new map file, determining the serial numbers of updated map files in such a manner that previously assigned old serial numbers of map files which are not updated are not changed and new serial numbers which follow the old serial numbers are assigned in ascending order to map files which are updated, creating a serial number management file in which marks are respectively written at positions corresponding to the serial numbers of the map files, and generating map-updating data, the map-updating data including the map-updating file and the serial number management file.

While creating the serial number management file, when finishing creating a map-updating file for a predetermined map file, in the serial number management file, a first mark at a position corresponding to an old serial number of the predetermined map file may be deleted and a second mark may be written at a position corresponding to a new serial number of the predetermined map file.

The map-updating-data creating apparatus includes a map file input unit which transfers old map files and new map files, a processing unit which, for each old map file to be updated, creates a map-updating file for rewriting the old map file to a new map file, and which determines the serial numbers of updated map files in such a manner that the previously assigned old serial numbers of map files not being updated are not changed and new serial numbers following old serial numbers are assigned in ascending order to map files being updated, and creating a serial number management file in which marks are respectively written at positions corresponding to the serial numbers, and a map-updating-data output unit which generates map-updating data, the map-updating data including the map-updating file and the serial number management file.

According to a second aspect of the present invention, the above objects are achieved by a map updating method and a navigation apparatus that updates an old map file stored in a map storage unit to a new map file.

The map updating method includes performing sequential map-updating processing on a plurality of map files in order by using the map-updating data, determining whether or not a necessary map file required for navigation control has already been updated, and either if the necessary map file has already been updated then executing navigation control by using the necessary map file, and alternatively, if the necessary map file has not been updated then using the map-updating data to update the necessary map file which has not been updated and subsequently use the updated necessary map file to perform the navigation control.

The map updating method may further include performing the sequential map-updating processing by using the map-updating data while the navigation apparatus is not being occupied by the navigation control.

The map updating method may further include, if the necessary map file has not been updated, interrupting the sequential map-updating processing performed, and, after using the map-updating data to update the necessary map file which has not been updated, restarting the sequential map-updating processing performed in order.

The map updating method may further include, together with a map-updating file, acquiring a serial number management file in which marks are written at positions corresponding to the serial numbers of all map files obtained after the sequential map-updating processing finishes, and assigning, to an updated map file, a new serial number whose corresponding position in the serial number management file has a written mark, without changing the previously assigned serial number of a map file which is not updated. The determining step includes checking whether or not a mark is written at a position in the serial number management file which corresponds to the serial number of the necessary map file, and, when the mark is written, determining that the necessary map file has already been updated, and, when the mark is not written, determining that the necessary map file has not been updated.

Performing the map-updating processing in order may include specifying one of a geographic region and a predetermined location, and prioritizing updating a map file relating to one of the geographic region and a region within a set distance range from the predetermined location.

The navigation apparatus includes a map-data storage unit which stores old map data, a map-data reading/writing control unit which controls reading of the old map data from the map-data storage unit and writing of new map data into the map-data storage unit, a map-updating-data input unit which sends the map-updating data, and a control unit which performs sequential map-updating processing in order by using the map-updating data and determining whether or not a map file necessary for navigation control has already been updated, and in which, if the necessary map file has already been updated then the necessary map file is used to execute navigation control, and, if the necessary map file has not been updated then the map-updating data is used to update the necessary map file which has not been updated and the updated map file is used to execute the navigation control.

The control unit may include a serial-number-management-file storage unit which acquires and stores map-updating data, the map-updating data including a serial number management file in which marks are respectively written at positions corresponding to the serial numbers of all map files obtained after the map-updating processing finishes, and, in the control unit, a serial number whose corresponding position in the serial number management file has a written mark is assigned to an updated map file without changing the serial number of a map file which is not updated, and, by checking whether or not a mark is written at a position in the serial number management file which corresponds to the serial number of the necessary map file, it is determined whether or not the necessary map file has already been updated.

According to a third aspect of the present invention, the above objects are achieved by a map updating method that is a combination of the above map-updating-data creating method and the above map-data updating method.

According to another aspect of the present invention, the above objects are achieved by a map-data updating system including the above map-updating-data creating apparatus and the above navigation apparatus.

According to the present invention, map updating can be performed while performing navigation control.

According to the present invention, when a necessary map file required for navigation control has not been updated, updating of the necessary map file is prioritized (background updating), thus enabling navigation control based on a new map file obtained after updating.

According to the present invention, by assigning serial numbers to map files, it can be easily determined whether or not a map file stored in a map storage unit of a navigation apparatus is the latest map file containing up-to-date map data (a map file that does need rewriting or an updated map file).

According to the present invention, a serial number management file is received as map-updating data by a navigation apparatus together with a map-updating file. Even if, among map files stored in a map storage unit of a navigation apparatus, each map file whose updating is not necessary is not rewritten at all, it can be determined whether or not the map file is the latest map file.

According to the present invention, a region or a predetermined point is specified, and updating of a map file of the region or a map file relating to a region within a set distance range from the predetermined point can be prioritized. Thus, a map file of a region, such as a home, a company, or a destination, necessary for a user, can be initially updated and used.

BRIEF DESCRIPTION OF THE DRAWINGS

FIG. 6 is an illustration of difference data;

FIG. 9 is an illustration of creating map-updating data;

DESCRIPTION OF THE PREFERRED EMBODIMENTS

In order to update old map data to new map data, the old map data including a large number of files, a map-updating-data creating apparatus performs, for each old map file to be updated, creating a map-updating file for rewriting the old map file to a new map file, determining the serial numbers of updated map files in such a manner that the serial numbers of map files which are not updated are not changed and serial numbers which follow the maximum of already assigned serial numbers are assigned in ascending order to map files which are updated, creating a serial number management file in which marks or flags are respectively written at positions corresponding to the serial numbers of the map files, and generating, as map-updating data, the map-updating file and the serial number management file.

A navigation apparatus using the map-updating data to perform map-updating processing, performs in order, determining whether or not a map file necessary for navigation control has already been updated, if the necessary map file has already been updated, using the necessary map file to execute the navigation control, and, if the necessary map file has not been updated, using the map-updating data to update the necessary map file which has not been updated, and using the updated map file to perform the navigation control.

First Embodiment (A) Map-Data Updating System

Figure 1:
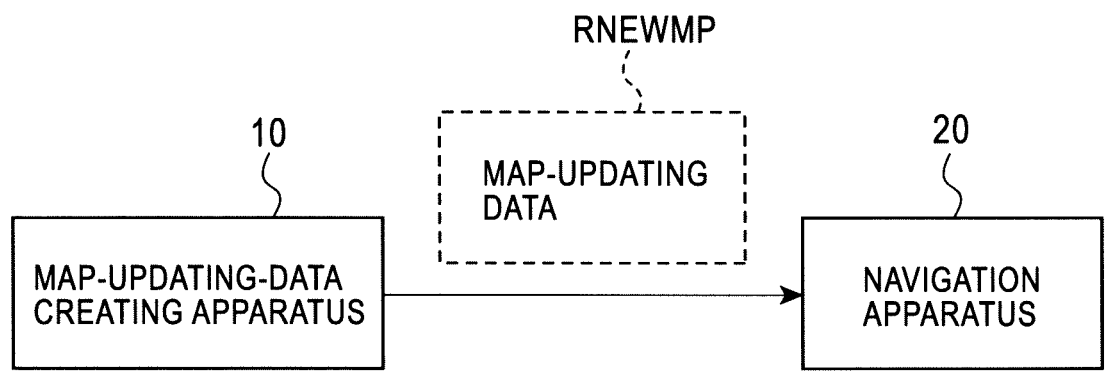
FIG. 1 is a block diagram showing a map-data updating system.

FIG. 1 is a block diagram of a map-data updating system. The map-data updating system includes a map-updating-data creating apparatus 10 that creates map-updating data for updating old map data into new map data, and a navigation apparatus 20 that performs map updating by using the map-updating data. The map-updating-data creating apparatus 10 records map-updating data RNEWMP in a recording medium such as a DVD (digital versatile disk), a CD (compact disk), or a memory card, and uses the recording medium to input the map-updating data RNEWMP to the navigation apparatus 20. Alternatively, the map-updating-data creating apparatus 10 and the navigation apparatus 20 are connected to each other by a communication link (such as a wireless link or the Internet) so that both apparatuses can communicate with each other, and the map-updating-data creating apparatus 10 establishes communication to transmit the map-updating data RNEWMP to the navigation apparatus 20 in response to a request from the navigation apparatus 20.

(B) Map-Updating-Data Creating Apparatus 10

Figure 2:
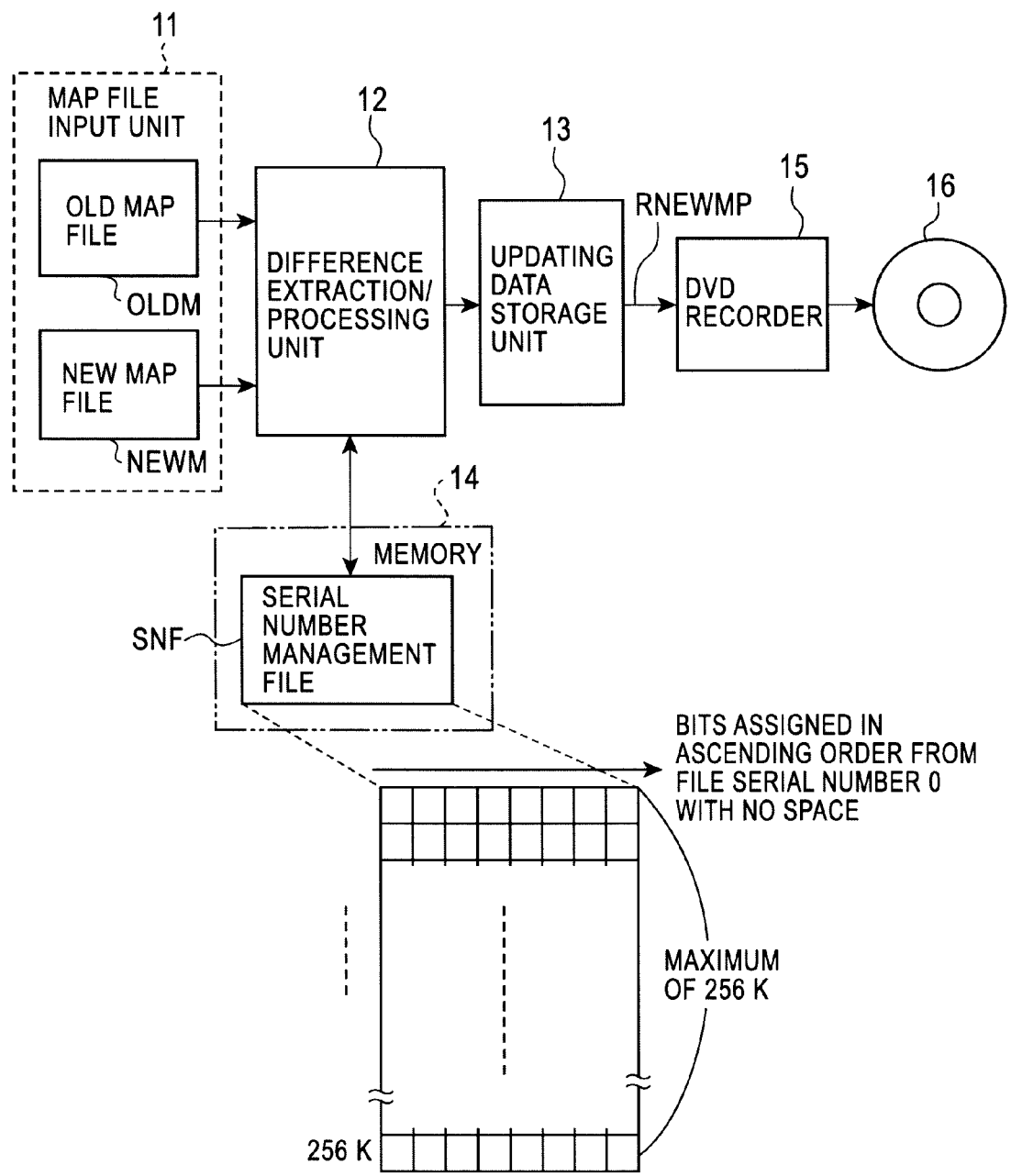
FIG. 2 is a block diagram showing a map-updating-data creating apparatus.

FIG. 2 is a block diagram of the map-updating-data creating apparatus 10, and shows an example of writing the map-updating data RNEWMP in a DVD. A map file input unit 11 inputs an old map file OLDM and a new map file NEWM to a difference extraction/processing unit 12. The difference extraction/processing unit 12 finds difference data between the old map file OLDM and the new map file NEWM in units of map files. The difference extraction/processing unit 12 creates a map-updating file based on the difference data and stores the map-updating file in an updating data storage unit 13. At this time, the difference extraction/processing unit 12 updates a serial number management file SNF stored in a memory 14 in accordance with a process described later, and stores the updated file in the memory 14 and inputs the updated file to the updating data storage unit 13.

In the updating data storage unit 13, map-updating files and the serial number management file SNF are stored as map-updating data. The updating data storage unit 13 inputs the map-updating data RNEWMP to a DVD recorder 15 in response to a request from the DVD recorder 15. The DVD recorder 15 creates an updating DVD by writing the map-updating data RNEWMP in a DVD 16. Instead of the DVD, an arbitrary recording medium, such as a CD-ROM, a semiconductor memory, or a memory card, can be used.

(C) Navigation Apparatus 20

Figure 3:
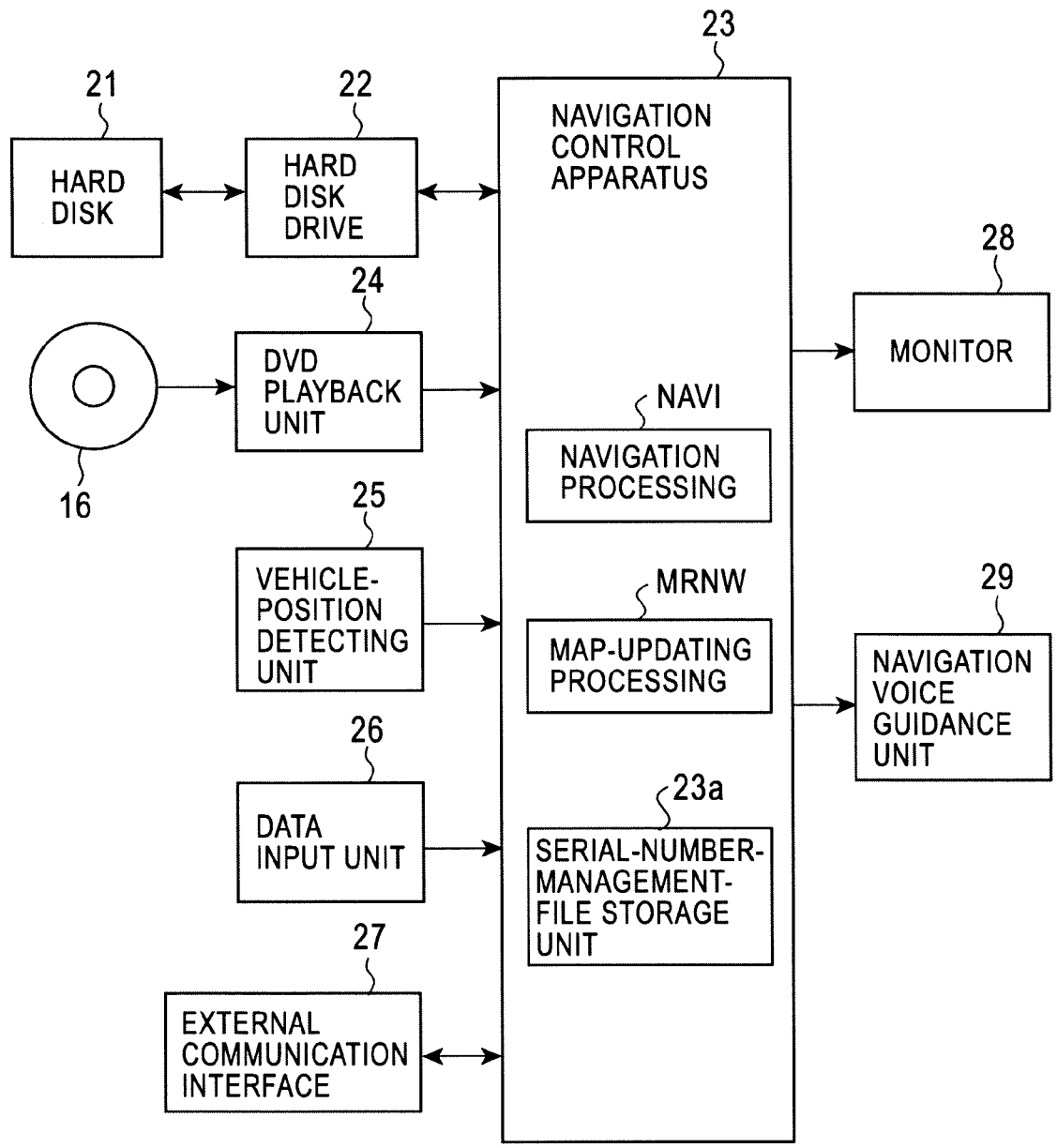
FIG. 3 is a block diagram showing a navigation apparatus.

FIG. 3 is a block diagram of the navigation apparatus 20. In a map storage unit 21 (e.g., a hard disk), navigating map data is recorded in file form. In accordance with a request from a navigation control apparatus 23, a hard disk drive 22 can read the map data from the hard disk 21 and can write new map data on the hard disk 21. A DVD playback unit 24 reads the map-updating data RNEWMP from the DVD 16 and sends the read data to the navigation control apparatus 23. A vehicle-position detecting unit 25 detects an automobile position and sends the detected position to the navigation control apparatus 23. This allows the navigation control apparatus 23 to perform navigation control by using the map data. A data input unit 26 includes a touch panel and a remote controller, and receives various commands and data. An external communication interface 27 communicates with an external device by means of a cellular phone, the Internet, etc. By communicating with the map-updating-data creating apparatus 10 without reading the map-updating data RNEWMP from the updating DVD 16, the map-updating data RNEWMP can be acquired. A monitor 28 displays navigation maps, and displays an operation menu, if needed. A navigation voice guidance unit 29 uses speech to inform a user of guidance (such as a right/left turn direction and a distance to an intersection) at an intersection that comes close.

Figure 4:
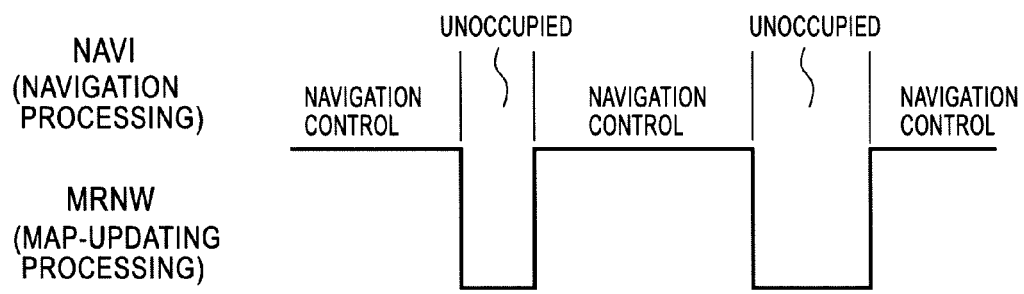
FIG. 4 is an illustration of multitask control of navigation processing and map-updating processing.

The navigation control apparatus 23 performs multitask control to simultaneously execute navigation processing NAVI and map-updating processing MRNW in parallel. However, since the navigation processing NAVI is higher in priority than the map-updating processing MRNW, as shown in FIG. 4, the map-updating processing MRNW is performed in unoccupied periods in which the navigation processing NAVI is performed.

The navigation control apparatus 23 updates the map data (old map data) stored in the hard disk 21 by using the map-updating data (the map-updating file and the serial number management file) read from the updating DVD 16 in the map-updating processing MRNW. The map-updating processing MRNW is performed by using the map-updating data in a direction of, for example, the north to south of Japan, that is, a sequential manner from Hokkaido to Kyushu. This is called "entire updating processing". When a map file of a region whose data is not updated is requested in the navigation processing NAVI, the entire updating processing is interrupted and the map data of the region is updated. This is called "on-demand updating processing". After the on-demand updating processing finished, the entire updating processing is restarted, and navigation control is performed based on the new map file that is updated on demand. In the updating processing, the navigation control apparatus 23 creates a new map file by using the map-updating file read from the updating DVD 16 and the old map file read from the hard disk 21, and uses the new map file to update the old map data stored in the hard disk 21. The navigation control apparatus 23 does not change the serial number of the map file that is not updated, and changes the serial number of the updated map file to a new serial number. The new serial number is an initial number greater than the maximum of serial numbers that have been assigned.

(D) Difference Data

Figure 5:
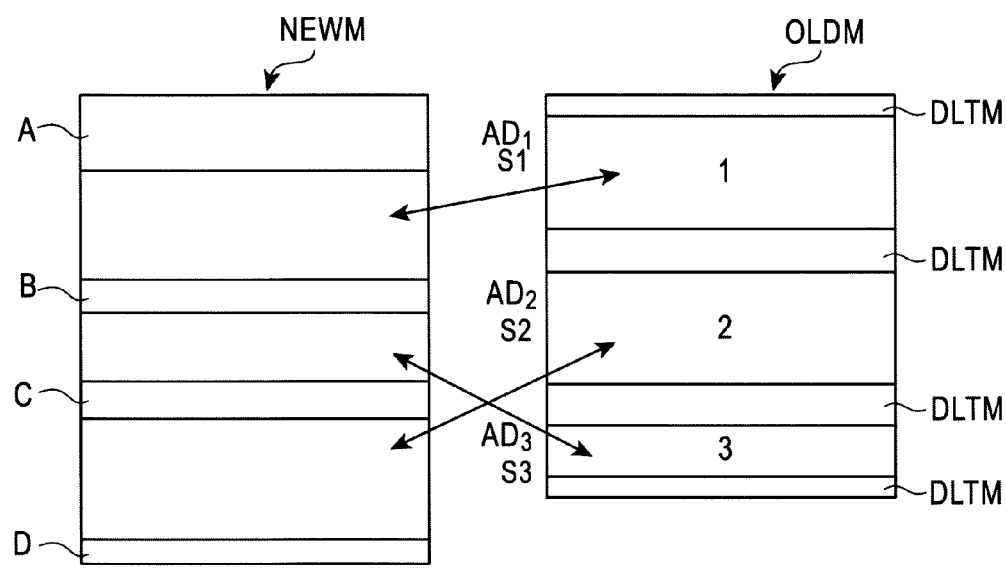
FIG. 5 is an illustration of a difference-data creating method of the map-updating-data creating apparatus.

FIG. 5 is an illustration of a difference data creating method of the map-updating-data creating apparatus 10. The difference data creating method compares the new map file NEWM and the old map file OLDM in units of bytes. In this method, by (1) searching for old map data areas that match new map data areas, and (2) sequentially arranging sets of the start addresses and sizes of the old map data areas, and the new map data that does not match the old map data, difference data is created. In FIG. 5, pairs of portions denoted by bidirectional arrows are identical areas between the old map file OLDM and the new map file NEWM. Unmatched area data DLTM in the old map file OLDM is discarded and unmatched area data A to data D in the new map file NEWM are added as difference data. An old data area that matches a corresponding new data area is specified by the start address $AD_i$ and size $S_i$ of the old data area. In the example of FIG. 5, the difference data is as shown in FIG. 6. Specifically, the configuration of the difference data is as follows:

New map file: data A
Old map file: designation (start address $AD_1$, size $S_1$) of data 1
New map file: data B
Old map file: designation (start address $AD_3$, size $S_3$) of data 3
New map file: data C
Old map file: designation (start address $AD_2$, size $S_2$) of data 2
New map file: data D (E) Serial Numbers The map files stored in the hard disk 21 of the navigation apparatus 20 have sequential serial numbers assigned in ascending order from an initial number of zero. In updating maps, in one embodiment, the navigation apparatus 20 does not change the serial numbers of map files that are not updated, and assigns, to updated map files, in ascending order, sequential serial numbers that follow the maximum of already assigned serial numbers.

Figure 7:
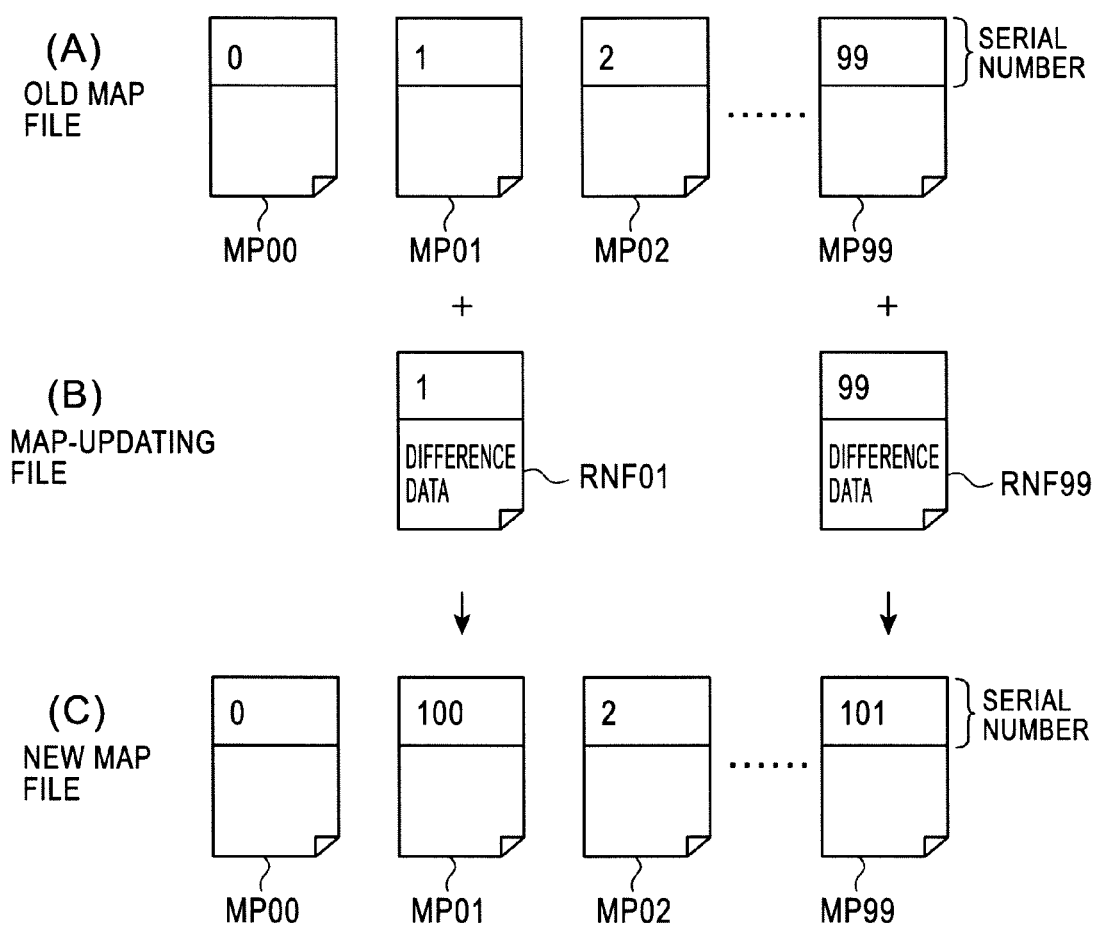
FIG. 7 is an illustration of the serial numbers of map files.

FIG. 7 is an illustration of the serial numbers of map files. Although, in FIG. 7, the number of map files is 100 for brevity of description, approximately hundred-thousand map files exist.

In an initial state, as shown in part (A) of FIG. 7, sequential serial numbers 0, 1, 2, . . . , 99 are assigned to 100 map files MF00 to MF99. In this state, by updating map files MF01 and MF99 whose serial numbers are 1 and 99 by using map-updating files RNF01 and RNF99 shown in part (B) of FIG. 7, the updated map files, that is, new map files, have the serial numbers shown in part (C) of FIG. 7. In other words, by changing the serial numbers of the updated map files MF01 and MF99 without changing the serial numbers of the map files that are not updated, sequential serial numbers 100 and 101 that follow the maximum (99) of the already assigned serial numbers are assigned to the updated map files.

(F) Serial Number Management Files

Figure 8:
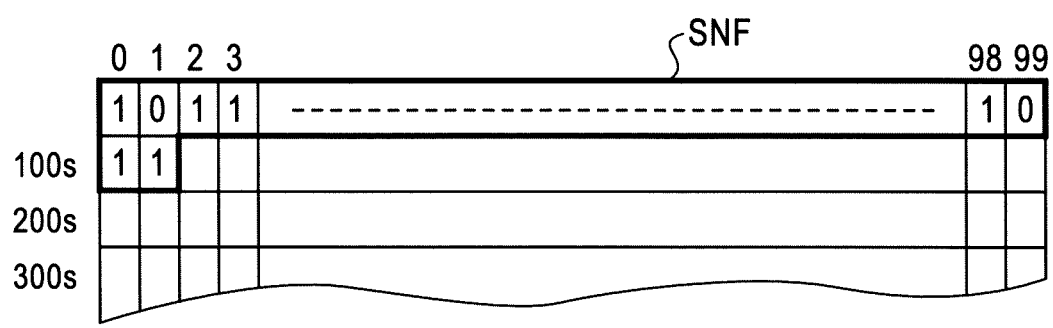
FIG. 8 is an illustration of a serial number management file SNF created by the map-updating-data creating apparatus.

FIG. 8 is an illustration of the serial number management file SNF created by the map-updating-data creating apparatus 10. The difference extraction/processing unit 12 of the difference extraction/processing unit 12 creates the serial number management file SNF by, as shown in FIG. 8, writing "1's" at bit positions corresponding to the serial numbers 100 and 101 of the new map files, and writing "0's" at bit positions corresponding to the serial numbers 1 and 99 of the map files before updating.

The serial number management file SNF has a size of N bytes. In the serial number management file SNF, bit positions of bytes from the first byte to the N-th byte are used as positions corresponding to serial numbers, and "1's" are written at bit positions corresponding to the serial numbers of map files. FIG. 2 shows the serial number management file SNF, which has 256 kilobytes. Since one byte represents eight serial numbers, the end bit of 256 kilobytes has a position corresponding to serial number 2,097,152 (=256×1024×8). The number of map files is approximately hundred thousand. Thus, by repeating annual updating of map data several tens of times, a plurality of serial number management files SNF are generated. In this case, a serial number management file number corresponding to serial number n is a quotient obtained when n is divided by 2097152, and the bit position is a remainder.

The serial number and serial number management file SNF can be used to identify whether or not a map file stored in the DVD 16 is the latest map file (a map file that does not need to be rewritten or updated map file), as described later.

(G) Map-Updating-Data Creating Processing

FIG. 9 is an illustration of map-updating-data creating processing of the map-updating-data creating apparatus 10.

As shown in part (A) of FIG. 9, each of the numbers of old and new map files is 100, and 100 old or new map files have initial serial numbers 0 to 99. As shown in part (B) of FIG. 9, "1's" are written at bit positions corresponding to the serial numbers 0 to 99 of the serial number management file SNF.

The difference extraction/processing unit 12 of the map-updating-data creating apparatus 10 compares old map files MP00 to MP99 and new map files MP00' to MP99'. Since new map files MP01' and MP99' differ from old map files MP01 and MP99, at first, the difference extraction/processing unit 12 finds difference data between old map file MP01 and new map file MP01', and creates map-updating file RNF01 on the basis of the difference data and a new serial number. As shown in part (C) of FIG. 9, the difference extraction/processing unit 12 writes "0" at the bit position corresponding to the serial number 1 of the serial number management file SNF, and writes "1" at the bit position corresponding to serial number 100 that follows the maximum (99) of already assigned serial numbers. The number 100 is used as a new serial number. Next, the difference extraction/processing unit 12 finds difference data between old map file MP99 and new map file MP99', and creates map-updating file RNF99 on the basis of the difference data and a new serial number. As shown in part (D) of FIG. 9, the difference extraction/processing unit 12 writes "0" at the bit position corresponding to the serial number 99 of the serial number management file SNF, and writes "1" at the bit position corresponding to serial number 100 that follows the maximum (100) of the already assigned serial numbers. The number 101 is used as a new serial number. The above operations complete creating the map-updating files RNF01 and RNF99 and updating the serial number management file SNF. After that, the map-updating-data creating apparatus 10 sends the serial number management file SNF and the map-updating files RNF01 and RNF99 as map-updating data to the navigation apparatus 20.

(H) Map-Updating-Data Creating Process Flowchart

Figure 10:
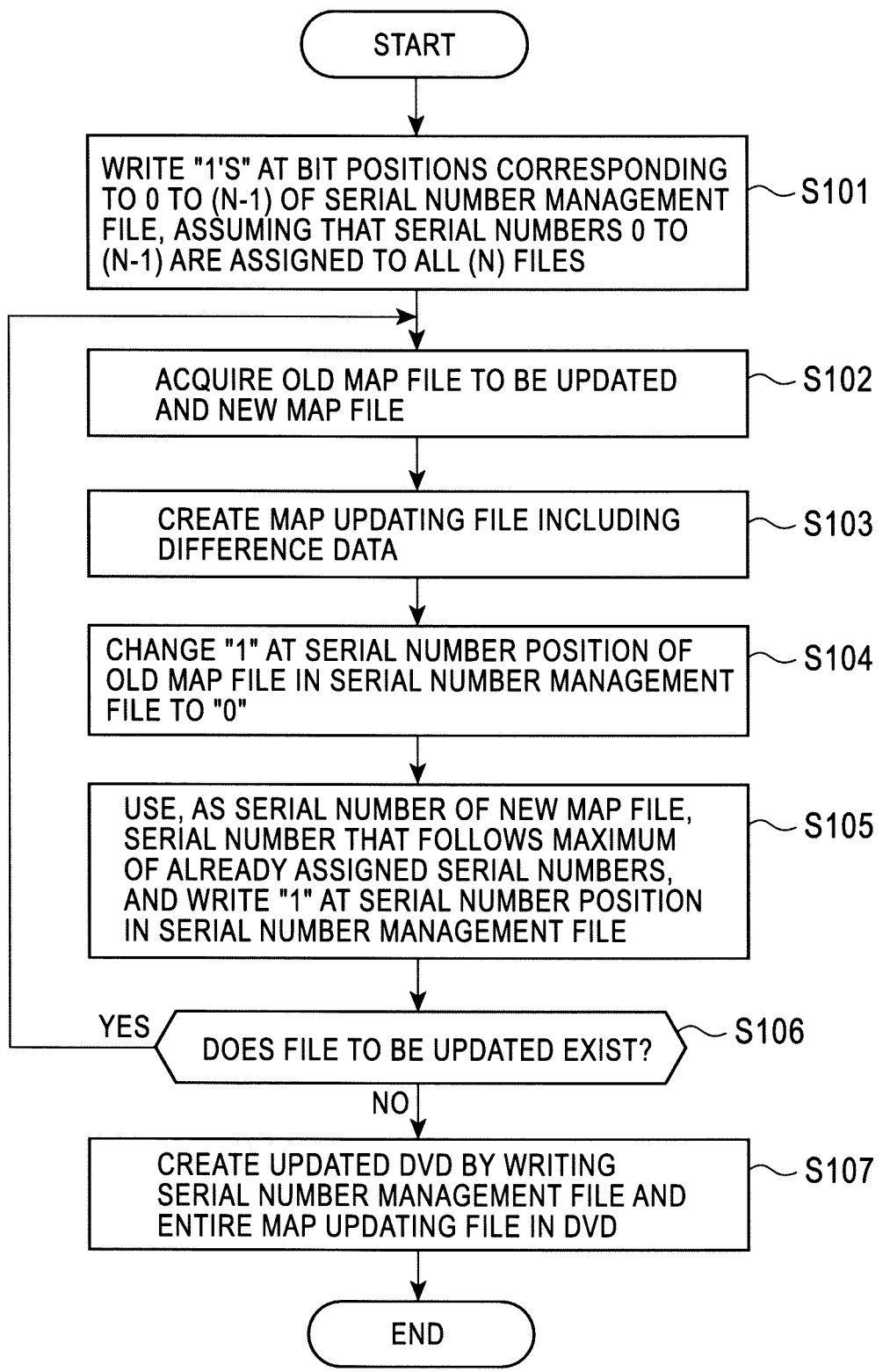
FIG. 10 is a flowchart showing a map-updating-data creating process.

FIG. 10 is a map creating process flowchart of the map-updating-data creating apparatus 10.

In an initial state, serial numbers 0 to 99 are assigned to all the map files (100 map files). Accordingly, in step S101, "1's" are written at the bit positions corresponding to the serial numbers 0 to 99 of the serial number management file SNF (see part (B) of FIG. 9).

In step S102, an old map file to be updated and a new map file are read. In other words, the old and new map files are read and compared with each other. If both differ, it is determined that the old map file is to be updated, and the process ends. Alternatively, if both match each other, it is determined that the old map file is not to be updated, and the next old and new map files are read and compared. This is repeatedly performed until old and new map files differ from each other.

After acquiring an old map file to be updated and a new map file (the old map file MF01 and new map file MF01' in part (A) of FIG. 9), in step S103, difference data between both files is found and used to create updating file RNF01. In the updating file RNF01, the old map file name is included.

After completing the updating file RNF01, the serial number of updated map file MF01 generated by using the updating file RNF01 is determined. In other words, number 100 that follows the maximum number 99 among the already assigned serial numbers is used as a new serial number after map file updating. At the serial number position in the serial number management file SNF, "1" is written, and, at the serial number position before map file updating, "0" is written (steps S104 and S105) (see part (C) of FIG. 9). In addition, the new serial number 100 is added to the updating file RNF01.

After that, in step S106, it is determined whether or not a map file to be updated exists. If the map file to be updated exists, processing in step S102 and thereafter is repeatedly performed. If the map file to be updated does not exist, in step S107, by writing, in the DVD 16, map-updating data including updating files, the DVD 16 in updated form is created.

According to the map-updating-data creating method of the present invention, a serial number management file is received as map-updating data by the navigation apparatus 20, together with map-updating files. Thus, the navigation apparatus 20 only needs to rewrite an old map on a hard disk after changing the serial number of a map file updated by using a map-updating file, and does not need to rewrite anything on a map file whose updating is not necessary.

(1) Map Updating Process Flowchart

Figure 11:
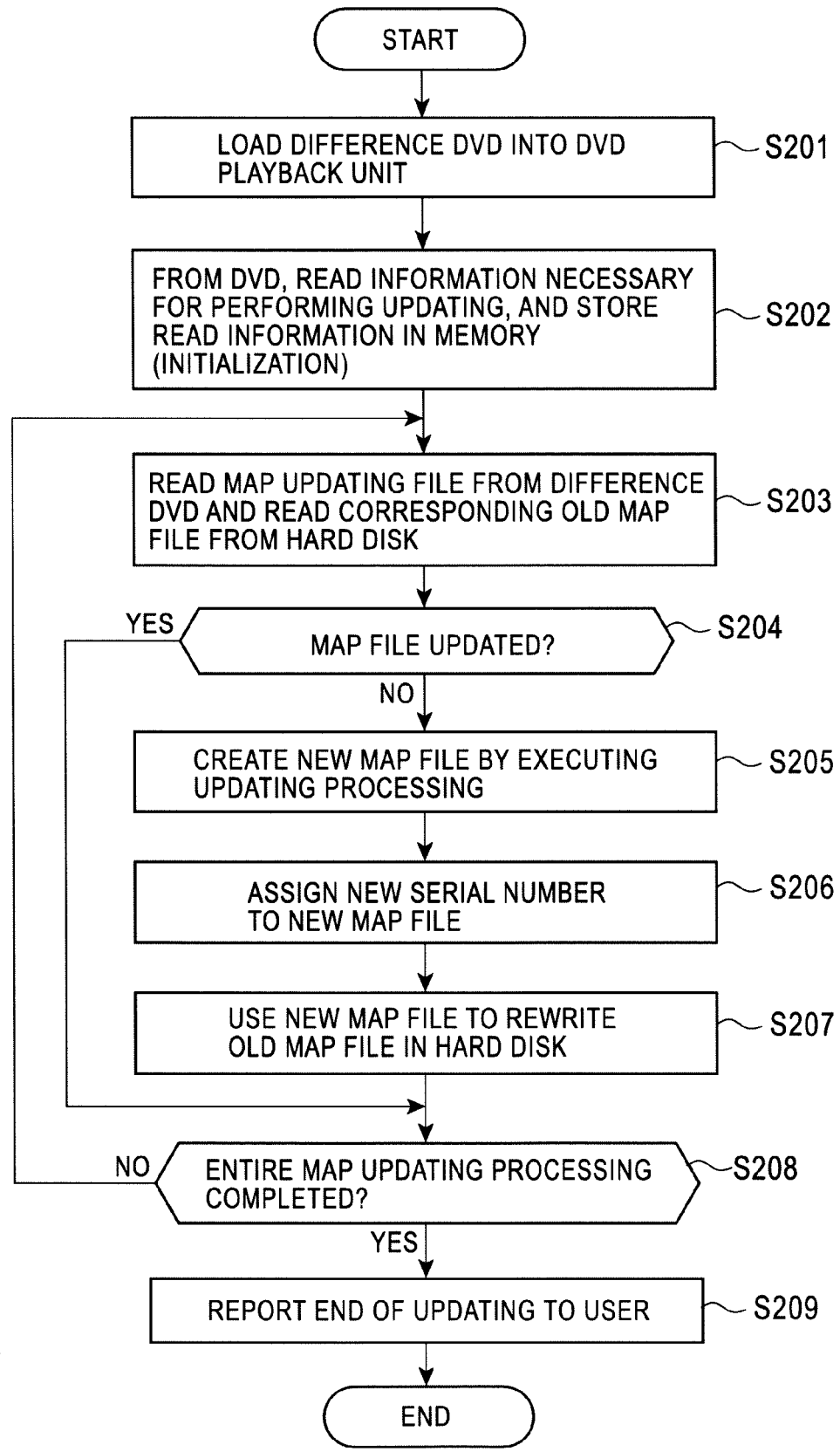
FIG. 11 is a map-updating process of the navigation apparatus.

FIG. 11 is a flowchart showing a navigation updating process of the navigation control apparatus 23. The DVD 16 in updated form is loaded in the DVD playback unit 24 and the DVD playback unit 24 is instructed to perform map updating (step S201). The navigation control apparatus 23 reads, from the DVD 16 in updated form, updating management files that are necessary for updating processing, and stores the read file in a built-in memory (initializing processing) (step S202). The updating management files include data for use in the process of updating and determination of the end of updating, and the serial number management file SNF. In the example in FIG. 3, the serial number management file SNF is stored in a serial-number-management-file storage unit 23a. Next, a map-updating file (RNF01 in the example in parts (A) to (C) of FIG. 7) is read from the updating DVD, and the old map file MP01 that uses the read map-updating file to perform updating is read from the hard disk 21 (step S203). In other words, by referring to a map file name (old serial number) included in the map-updating file RNF01, the old map file MP01, which is to be updated, is read from the hard disk 21. After that, by referring to the serial number management file (FIG. 8), it is determined whether or not "1" is written at the position of the serial number 1 (step S204). When "1" is written, it is indicated that file updating has been performed. When "0" is written, it is indicated that file updating has not been performed yet. There may be a case in which, when updating of the map file is prioritized regardless of order in background updating (described later), "1" is written. Since file updating has not been performed in the example in parts (A) to (C) of FIG. 7, by using difference data of the map-updating file RNF01 and the map file MP01 read from the hard disk 21, a new map file is created (step S205). New serial number 100 stored in the map-updating file is assigned as the serial number of the new map file (step S206). The new map file is used to rewrite the old map file in the hard disk 21 and the number of updated files is counted up (step S207). After that, it is determined whether or not the counted number is equal to the number of all changed files which is included in the updating management files read from the updating DVD 16 in step S202. If both numbers are not equal, the process returns to step S203 and repeatedly performs the following steps. If both numbers are equal, the end of updating is reported to a user and the map updating process finishes (step S209). According to the map updating process of the present invention, by assigning serial numbers to map files and referring to a serial number management file on the basis of the serial numbers, it can be easily determined whether or not a map file recorded in a map storage unit is the latest map file (a map file that does not need rewriting or an updated map file), so that updating processing can be promptly performed. In addition, according to the map updating process of the present invention, a serial number management file is sent as map-updating data together with a map-updating file. Thus, a navigation apparatus only needs to rewrite an old map in a hard disk after changing the serial number of an updated map file. In other words, among map files recorded in a hard disk, a map file that does not need updating may not be rewritten by the navigation apparatus since it does not need at all to change its serial number. As a result, the map updating time can be reduced compared with a map updating method of the related art in which the version numbers of all map files are rewritten regardless of whether updating is to be performed.

(J) Other Map Updating Flowchart

Map updating is normally performed in sequential order from the north to south (Hokkaido to Kyushu) of Japan. In this updating method, map data of a southern region is delayed, thus delaying a start time of navigation control based on new map data of the southern region. Accordingly, a region (e.g., Kyushu) or a predetermined point, such as a home, a company, or a destination, is specified, and updating of a map file relating to the region or a region within a set distance range from predetermined point is prioritized.

Figure 12:
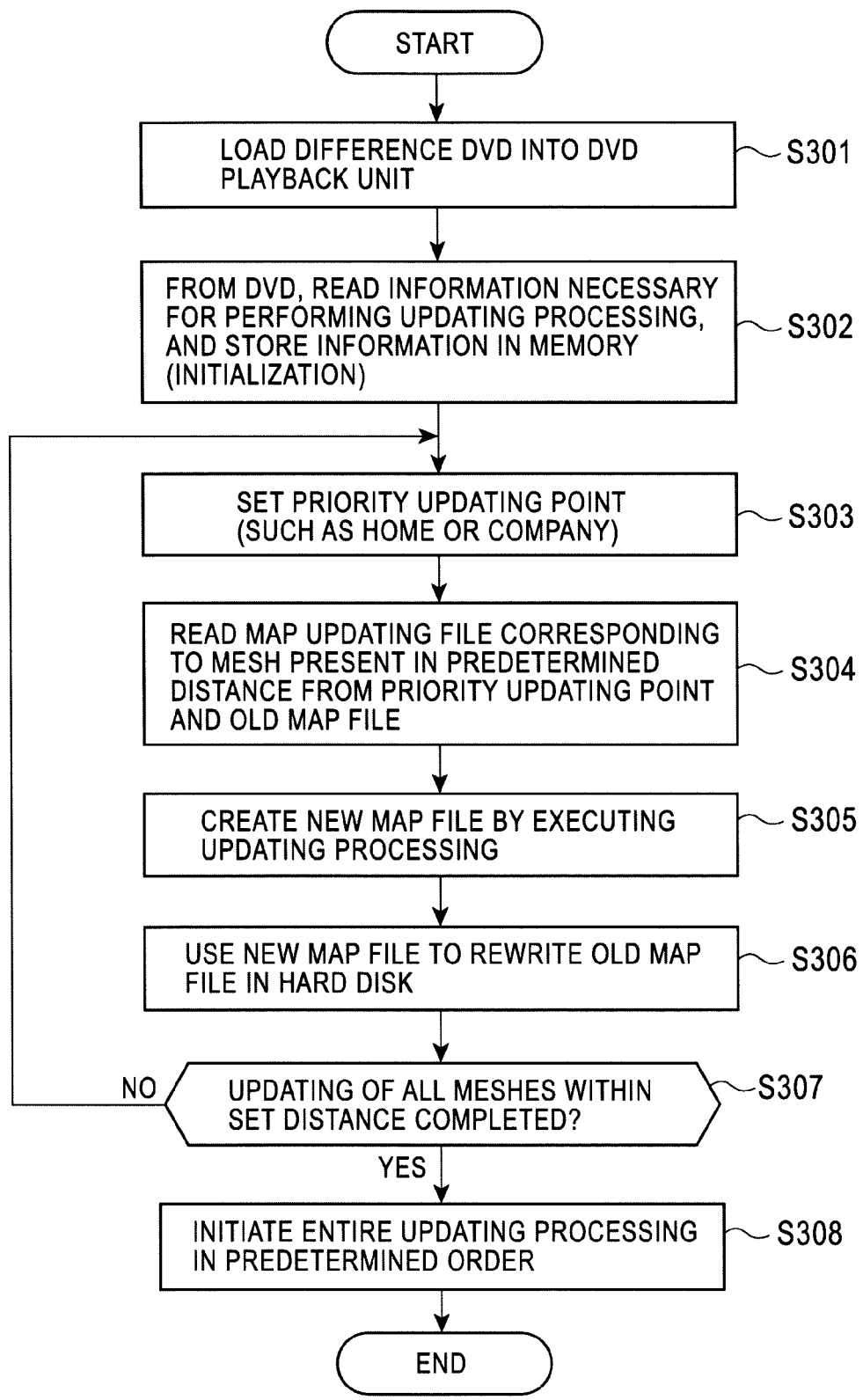
FIG. 12 is a flowchart showing a map-updating process of the navigation apparatus which prioritizes updating of a map of a region designated by a user or a region around a point.

FIG. 12 is a flowchart showing a map updating process of the navigation control apparatus 23 which prioritizes updating a map of a region designated by the user or a map of a region around the point.

After the updating DVD 16 is loaded into the DVD playback unit 24 (step S301), the navigation control apparatus 23 reads, from the DVD 16, an updating management file necessary for updating processing, and stores the read file in a built-in memory (initialization) (step S302). Next, by using the data input unit 26, the longitude and latitude of a region whose map updating is to be prioritized or of a predetermined position, such as a home, a company, or a destination, are sent to instruct the navigation control apparatus 23 to perform map updating (step S303).

The navigation control apparatus 23 reads, from the DVD 16, a map-updating file of a region (mesh) present in a set distance from the designated position, and reads, from the hard disk 21, a map file that is to be updated based on the map-updating file (step S304). Regarding the map-updating data, a desired map-updating file can be searched for on the basis of a longitude and latitude.

After that, by using difference data of the map-updating file and the old map file read from the hard disk 21, a new map file is created, and its serial number is changed (step S305), and the new map file is used to rewrite the old map file in the hard disk 21 (step S306).

After completing rewriting, it is determined whether or not updating of map files in all meshes within the set distance has finished (step S307). If the updating has not finished yet, the process returns to step S304 and repeatedly performs the subsequent steps. If the updating has finished, the updating process in step S203 and thereafter in FIG. 11 is executed (step S308).

(K) Background Updating

Figure 13:
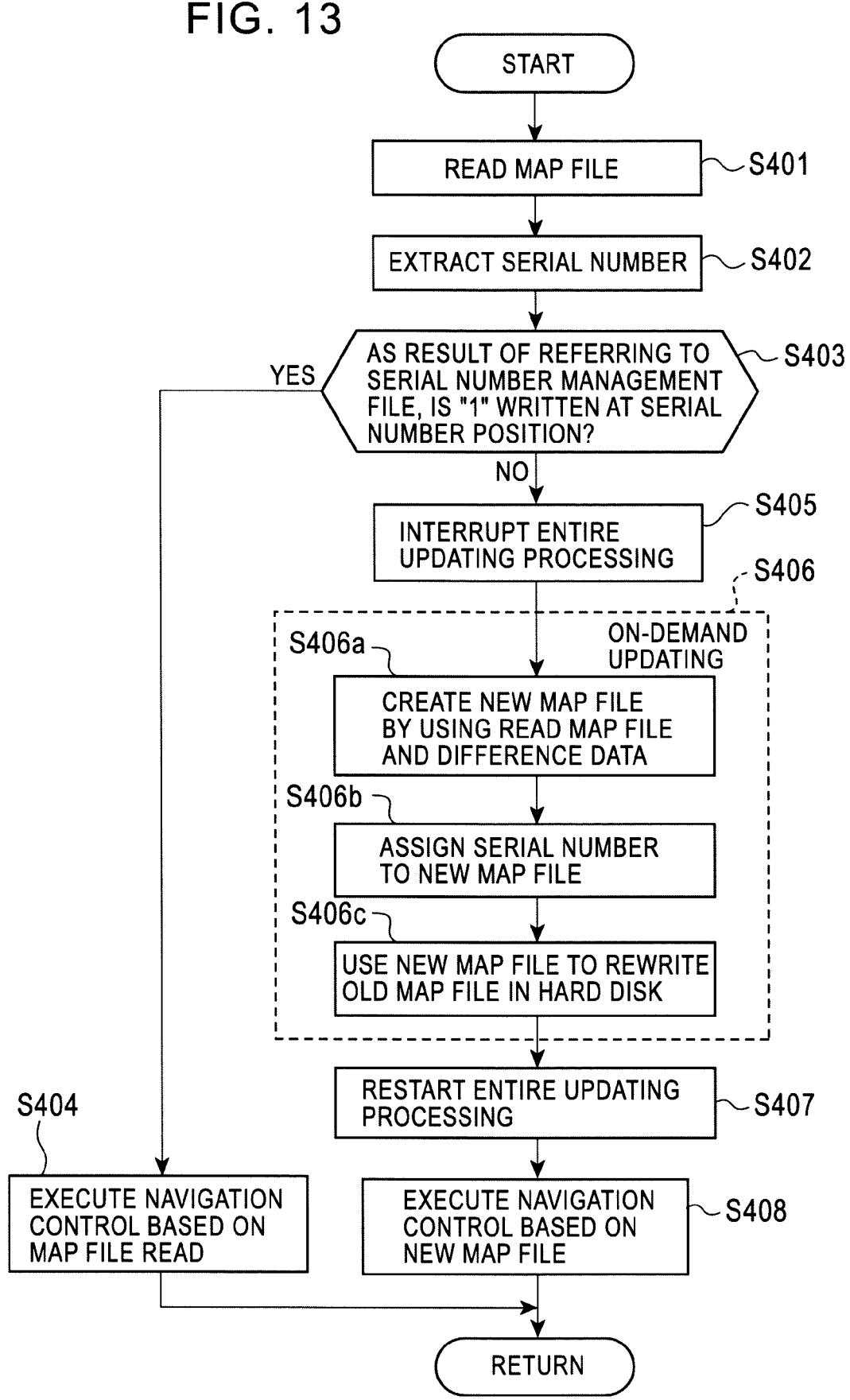
FIG. 13 is a flowchart showing a background updating process.

When navigation processing and map-updating processing are performed in parallel by multitask processing, there may be a case in which a map file necessary for navigation control has not been updated yet. In such a case, it would be convenient to perform navigation control by prioritizing updating the map file and using a new map file obtained by the updating. FIG. 13 is a flowchart showing an updating process (background updating process) of the present invention in which the updating is prioritized.

The navigation control apparatus 23 (FIG. 3) reads a map file necessary for navigation control (step S401), and extracts the serial number of the map file (step S402). Next, by referring to the serial number management file SNF, it is determined whether or not "1" is written at the bit position corresponding to the serial number of the map file (step S403). When "1" is written, it is indicated that the map file has already been updated. When "0" is written, it is indicated that the map file has not been updated yet.

If the map file has already been updated, navigation control is executed by using the read map file (step S404). Alternatively, if the map file has not been updated yet, the updating processing (the entire updating process in FIG. 11) is interrupted (step S405), and on-demand updating processing is executed (step S406).

In the on-demand updating processing, a map-updating file for updating the map file read in step S401 is read from the DVD 16 and difference data of the map-updating file is used to create a new map file (step S406a). A new serial number is assigned to the new map file (step S406b). In other words, a number that follows the maximum of the already assigned serial numbers is used as the serial number of the new map file. Next, after the new map file is used to rewrite the old map file in the hard disk 21 before the on-demand updating processing is finished (step S406c), the interrupted entire updating processing is restarted (step S407).

In addition, the navigation control apparatus 23 uses the new map file updated in step S406 to execute navigation control (step S408).

According to the background updating processing of the present invention, even if a map file necessary for navigation control has not been updated yet, updating of the map file is prioritized and the updated map file is used to perform navigation control. Thus, navigation control that always uses a new map file can be performed.

According to the present invention, by assigning serial numbers to map files and referring to a serial number management file on the basis of the serial numbers, it can be easily determined whether or not a map file stored in a map storage unit is the latest map file (a map file that does not need rewriting or an updated map file), thus easily realizing the background updating processing.

(L) Map Data

Figure 14A:
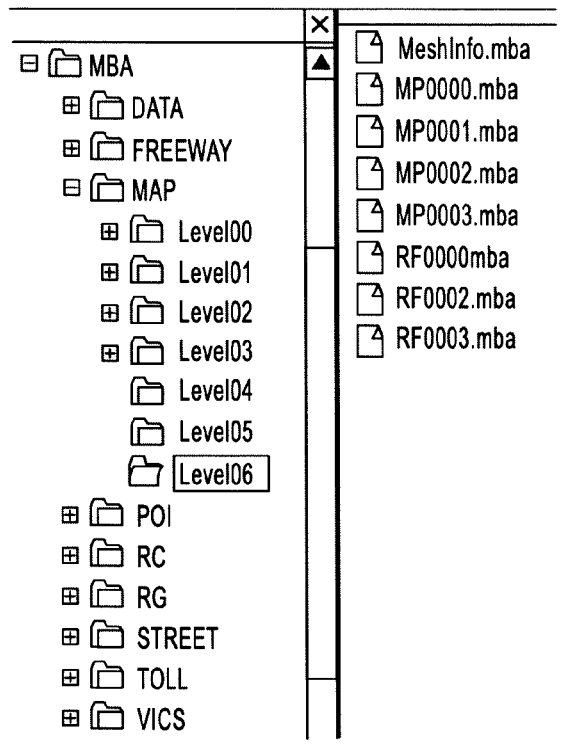
FIGS. 14A and 14B are illustrations of map data.

FIGS. 14A and 14B, and 15A and 15B are illustrations of map data. As shown in FIG. 14A, map data is created and recorded in the hard disk 21. The map data has a directory structure in which the map data is minutely divided in units of levels, areas, or search trees for each of functions (DATA, FREEWAY, MAP, POI, RC, RG, STREET, TOLL, and VICS). In the functions, DATA represents landmarks, junction map data, etc, FREEWAY represents expressway data, MAP represents map data, POL represents information search data, RC represents guidance-route search data, and RG represents route-guidance data, etc.

Map data MAP has a directory structure having seven levels from a detailed map (level 00) to a wide area map (level 06). When the map in each level is divided into meshes, each mesh includes map-displaying data files "MP XXXX.mba" and "RF XXX.mba". As shown in FIG. 14A, the map (entire Japan map) in level 06 is divided into three meshes and each mesh includes map-displaying data files "MP 0000.mba" to "MP0003.mba", and "RF0000.mba" to "RF0003.mba".

Figure 14B:
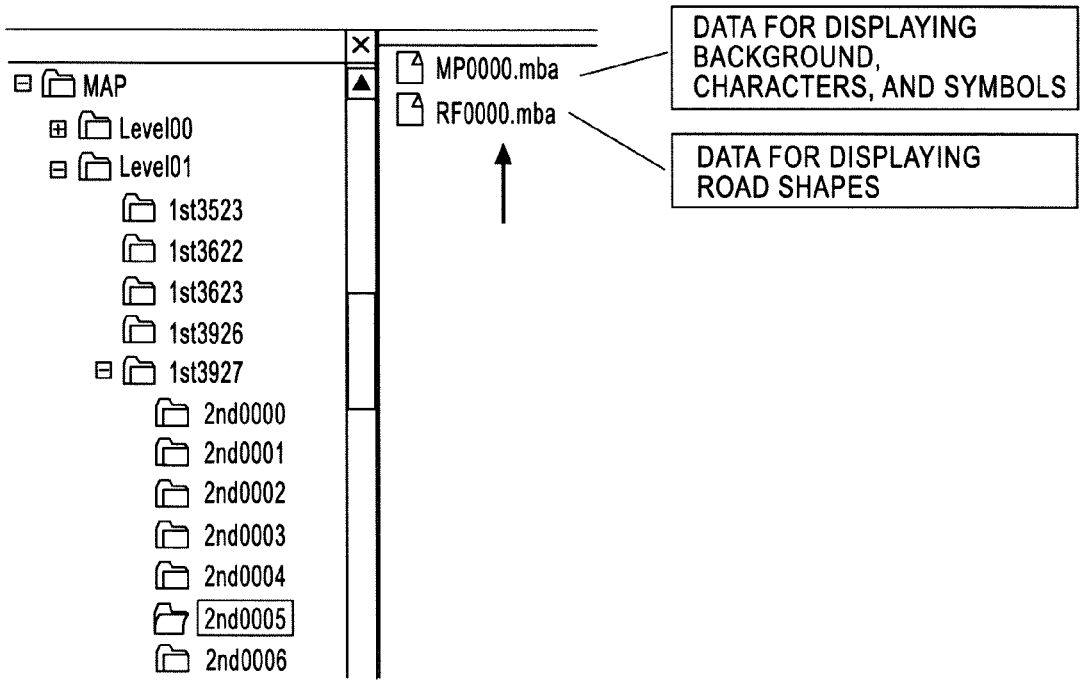

As shown in FIG. 14B, the map in level 01 is divided into five primary meshes, and each primary mesh is divided into six secondary meshes. Each secondary mesh includes predetermined map-displaying data files "MP0000.mba" and "RF0000.mba". Accordingly, the necessary map-displaying data files "MP0000.mba" and "RF0000.mba" can be sequentially acquired in the order of level-01 directory, $1^{st}3927$ directory, and $2^{nd}0005$ directory.

Figure 15A:
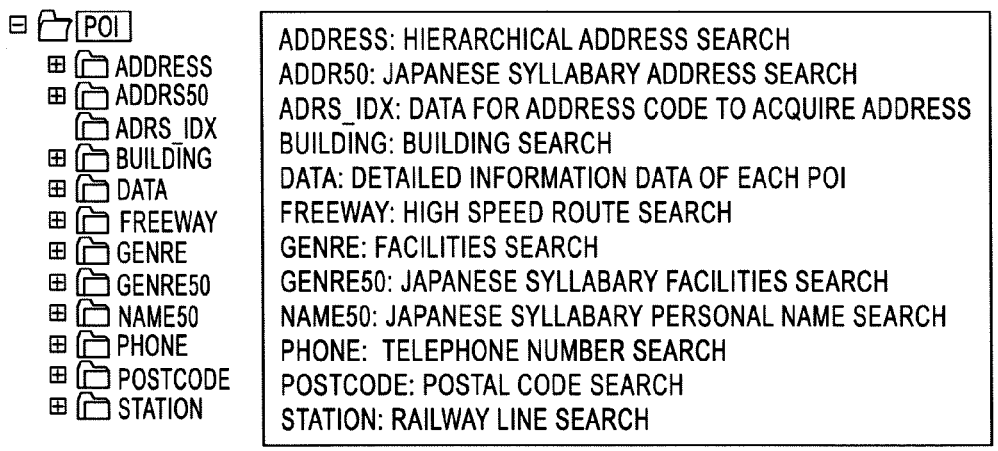
FIGS. 15A and 15B are illustrations of map data.

FIG. 15A shows an example of the configuration of information-search data POI. In the information-search data POI, each of the search items has a directory structure so as to enable address search, Japanese syllabary address search, building search, high speed route search, facilities search, telephone number search, etc.

Figure 15B:
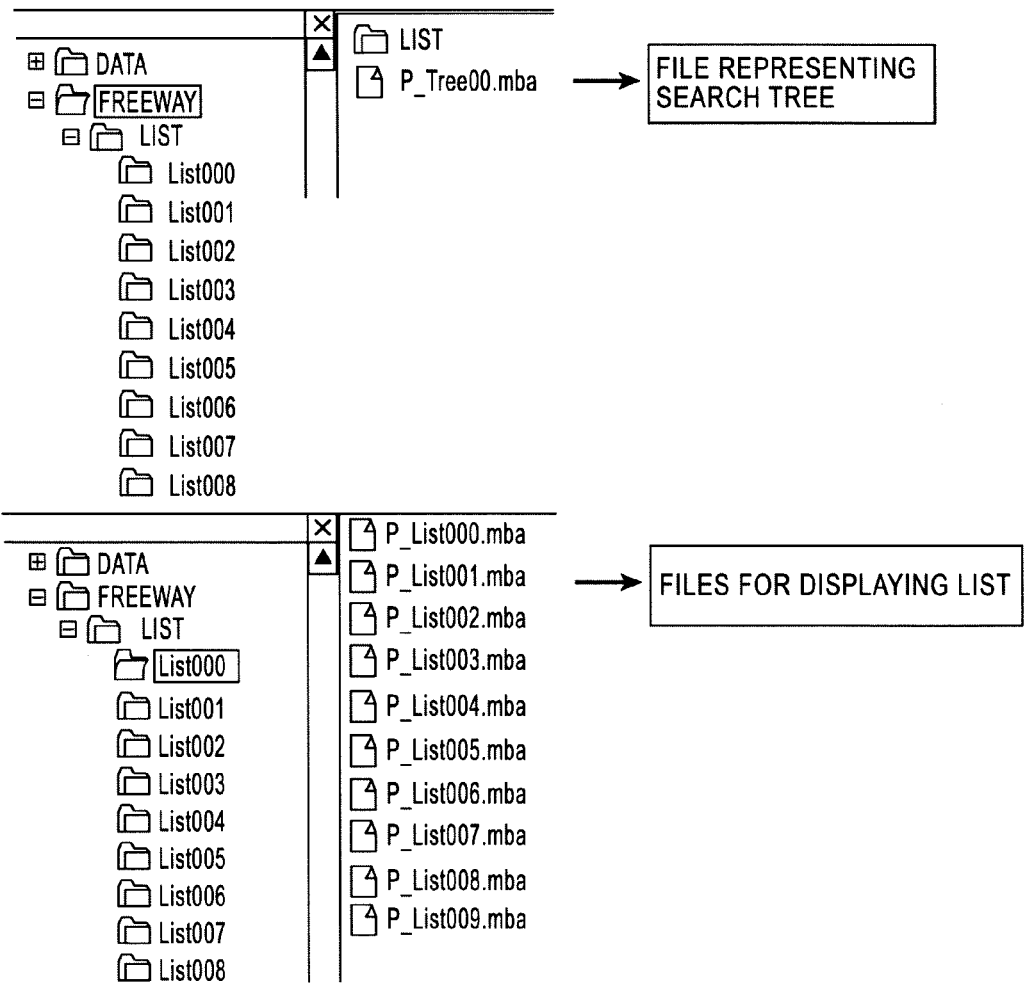

FIG. 15B shows an example of the configuration of high-speed-route search data FREEWAY. High-speed-route search data FREEWAY connects to two subdirectories "List" and "P_Tree00.mba". Subdirectory P_Tree00.mba represents a file representing a search tree. Directory LIST connects to "List 000" to "List 008" corresponding to nine regions (Hokkaido, Tohoku, Kanto, . . . , Kyushu), Hokkaido list "List 000" connects to files "P_list000.mba" to "P_list009".mba representing ten high speed routes.

(M) Updating Data (Map-Updating Data)

Figure 16A:
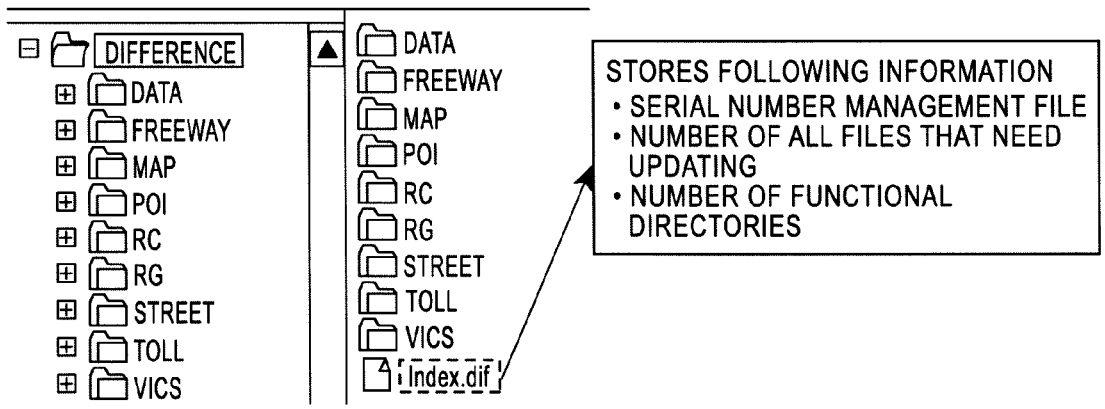
FIGS. 16A and 16B are illustration of updating data.

FIGS. 16A and 16B, 17A and 17B, and 18A and 18B, and 19 are illustrations of updating data. As shown in FIG. 16A, updating data (difference) connects to functional directories (DATA, FREEWAY, MAP, POI, RC, RG, STREET, TOLL, and VICS) to which a file to be updated is connected, and an "Index.dif" file. The Index.dif file specifies (1) the number of all updating files that are to be updated, (2) the number of directories to be updated, (3) the serial number management file SNF, etc. The map-updating file can be indicated for each function by a directory structure.

Figure 16B:
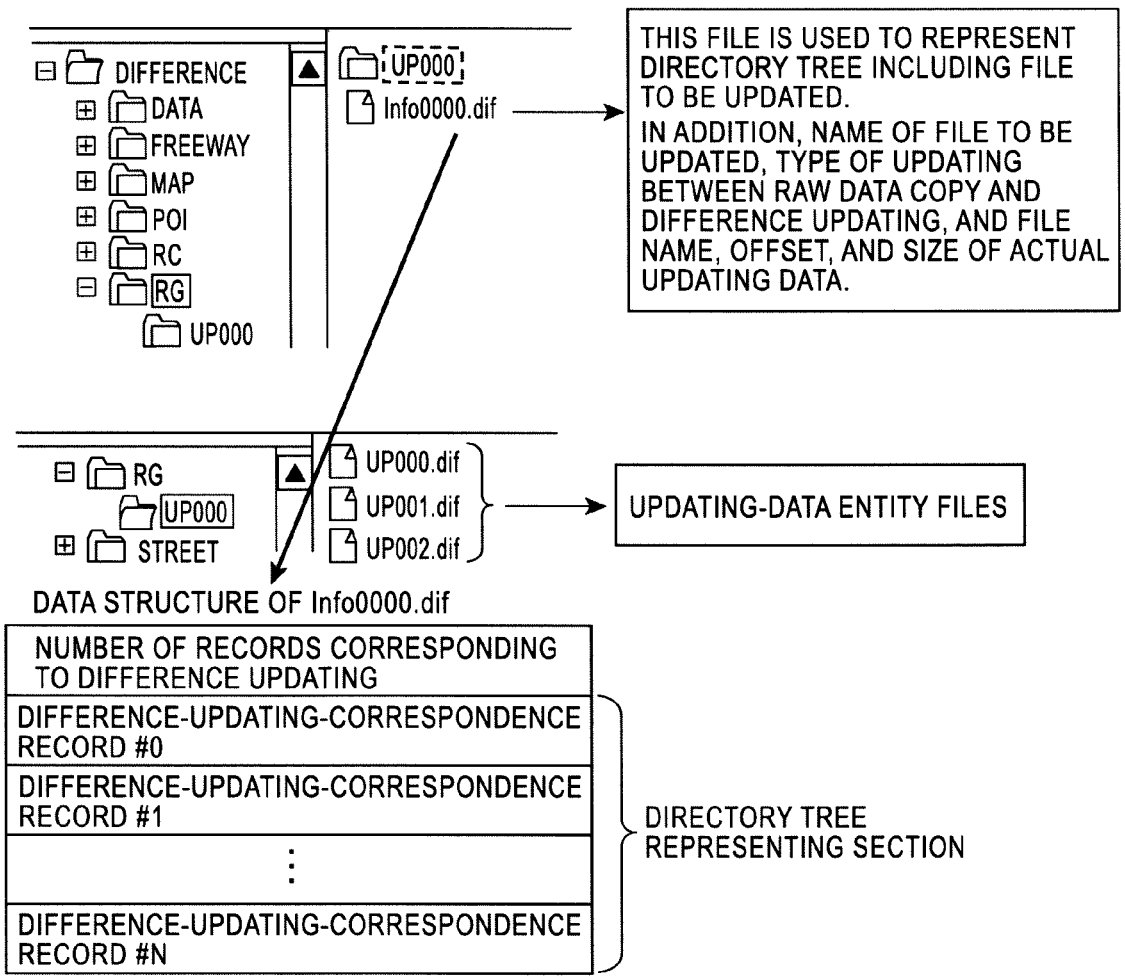

FIG. 16B is an illustration of the directory structure of function RG (route-guidance data). Functional directory RG connects to directories "UP000" and "Info0000.dif". Directory UP000 is used to specify updating-data entity files "UP0000.dif" to "UP0020.dif", and directory Info0000.dif is used to specify a plurality of difference-updating-correspondence records #0 to #N.

Figure 17A:
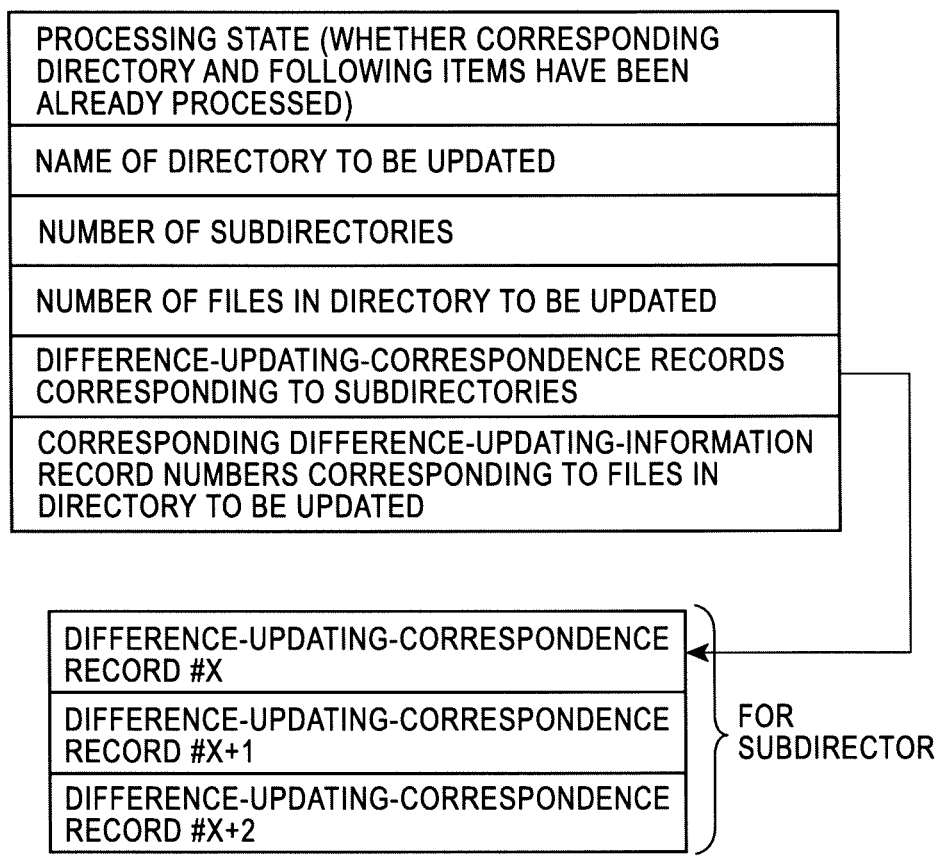
FIGS. 17A and 17B are illustrations of a difference-updating-correspondence record.

As shown in FIG. 17A, each difference-updating-correspondence record includes the following information:
(1) a processing state (whether corresponding directory and following items have been already processed);
(2) the directory name of a directory to be updated;
(3) the number of subdirectories (lower level directories);
(4) the number of files in the directory to be updated;
(5) difference-updating-correspondence records corresponding to the subdirectories; and (6) difference-updating-information record numbers corresponding to files in the directory to be updated.

Figure 17B:
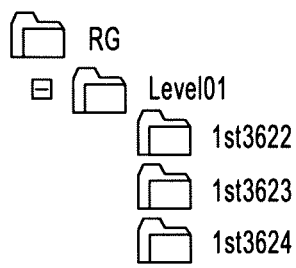

When the directory structure in FIG. 17B is described as an example, the directory to be updated is "MBA\RG\LEVEL01". Accordingly, its directory name is "LEVEL01". The number of subdirectories is 3 and the number of files is zero. Since the number of subdirectories is 3, difference-updating-correspondence records #X, #X+1, and #X+2 are specified. However, since the number of files is zero, no difference-updating-correspondence record is specified.

Figure 18A:
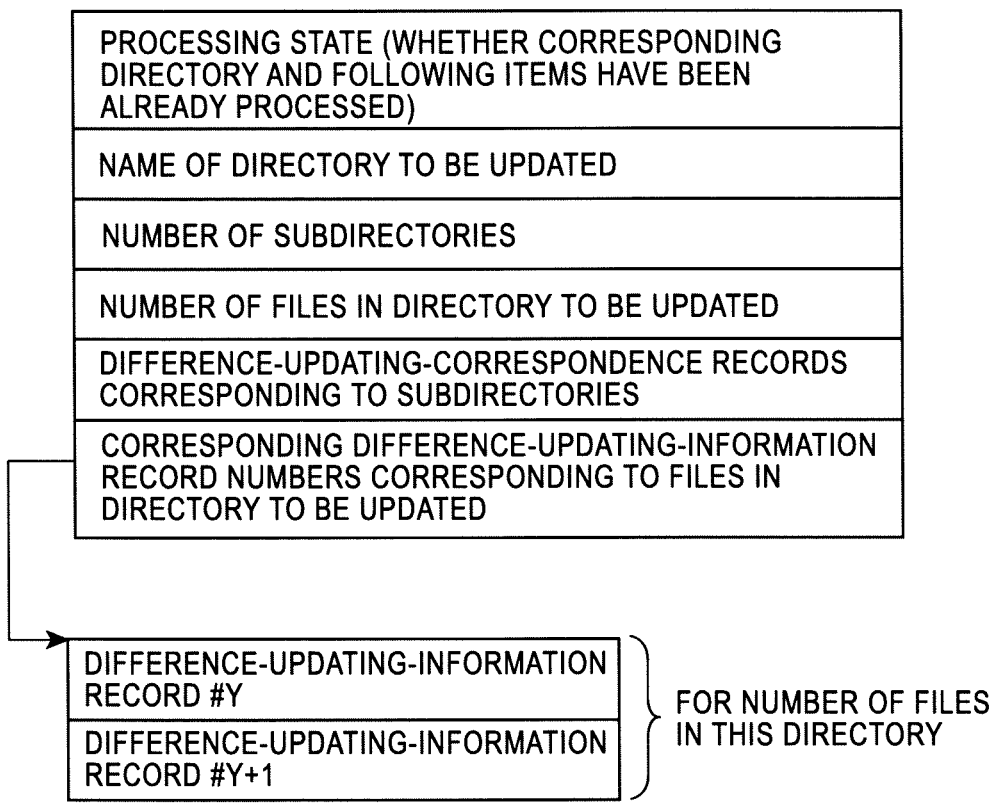
FIGS. 18A and 18B are other illustrations of a difference-updating-correspondence record.
Figure 18B:
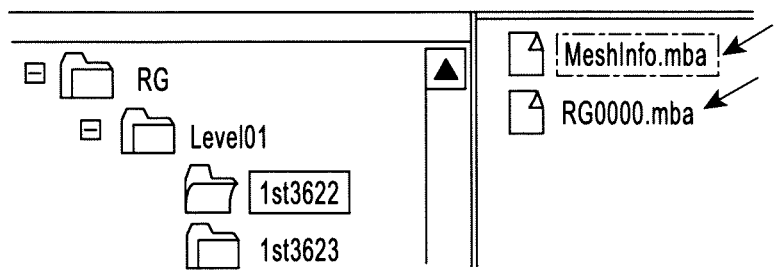

FIGS. 18A and 18B show other examples of difference-updating-correspondence records, and shows an example in which the number of subdirectories is zero and the number of files is 2. Accordingly, the directory name is "1$^{st}$3622". Since the number of subdirectories is zero, no difference-updating-correspondence record is specified. However, since the number of files is 2, two difference-updating-information records (that specify map-updating files) are written.

Figure 19:
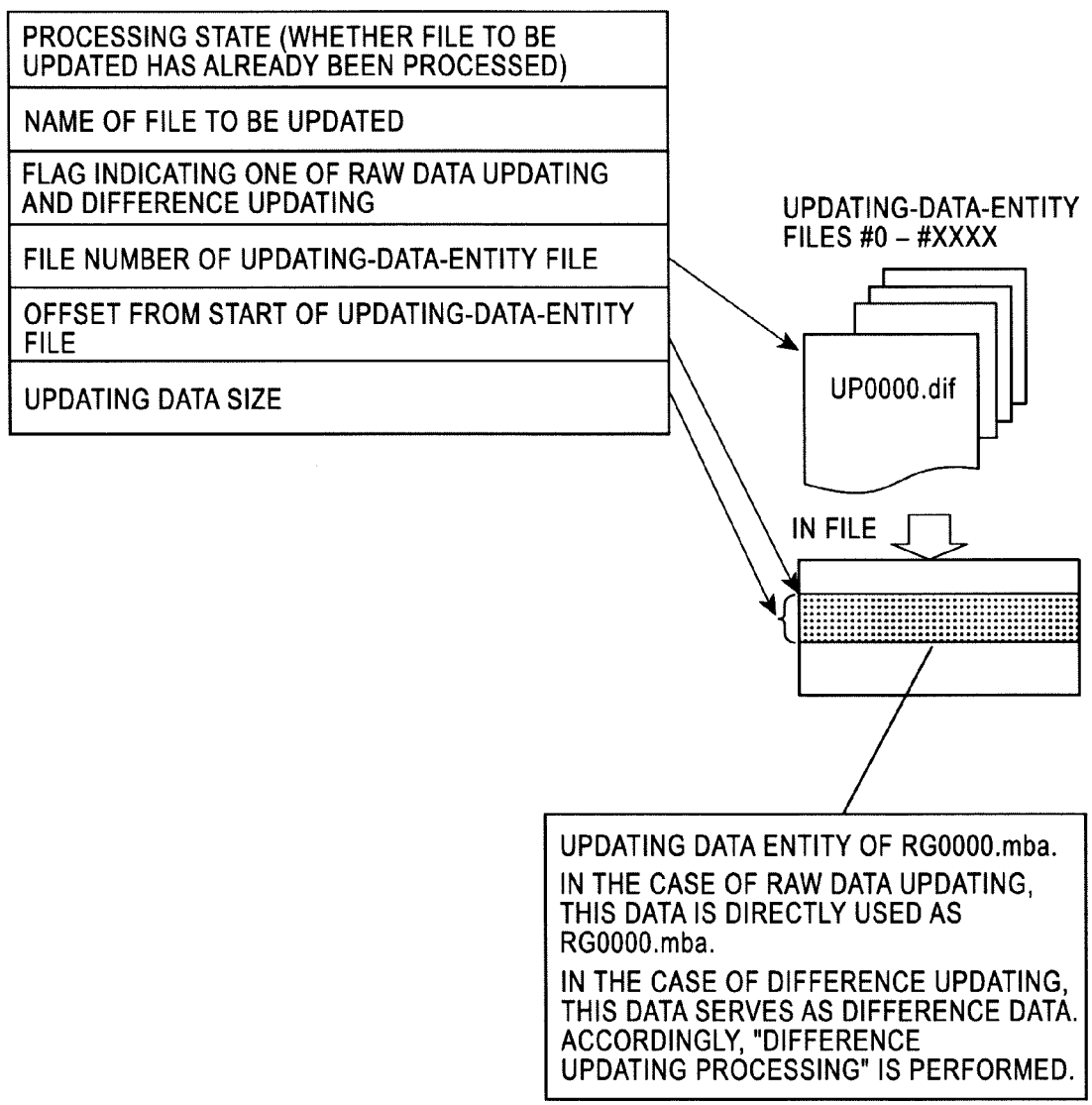
FIG. 19 is an illustration of a difference-updating-information record.
Figure 20:
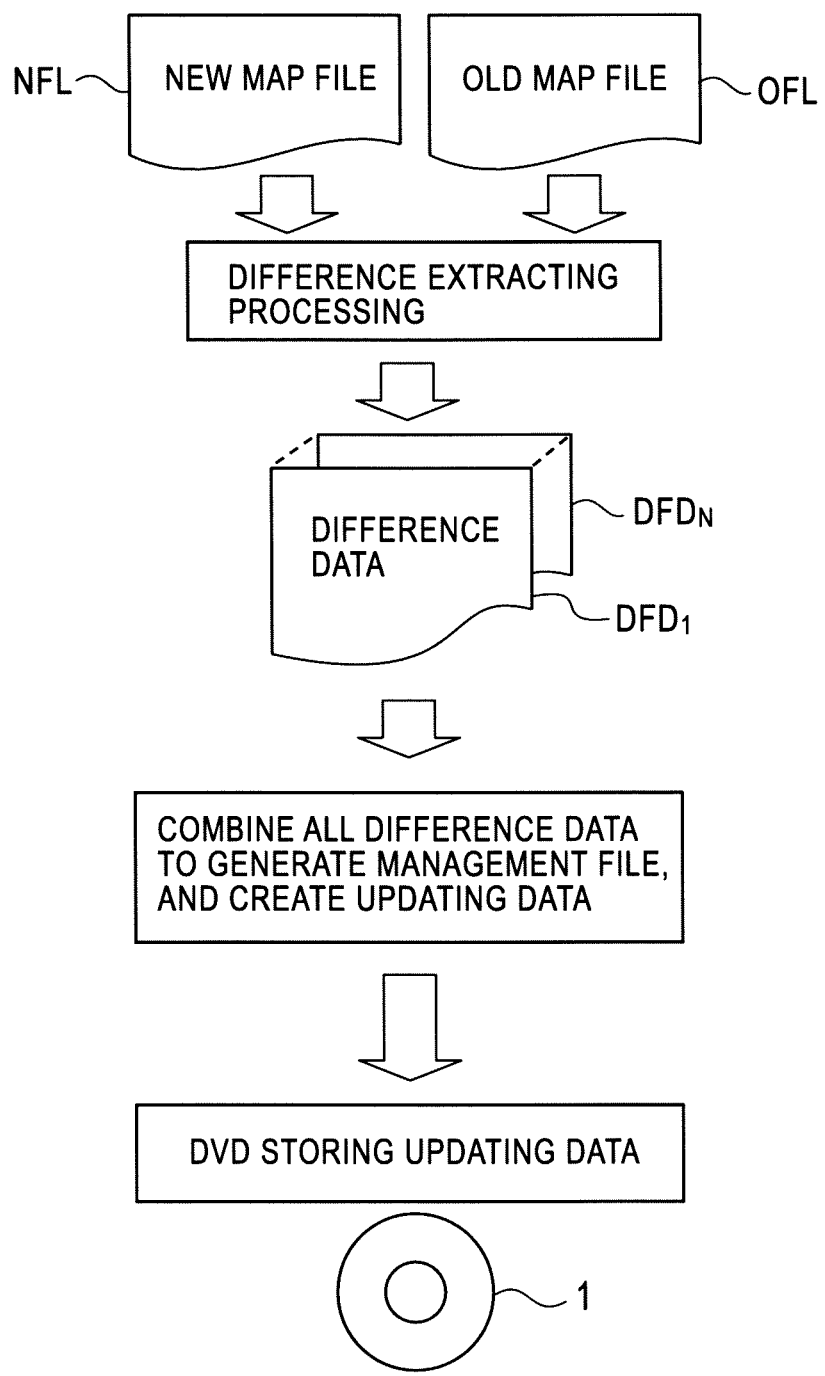
FIG. 20 is a schematic illustration of creation (of the related art) of an updating DVD by a map-difference-data creating apparatus.
Figure 21:
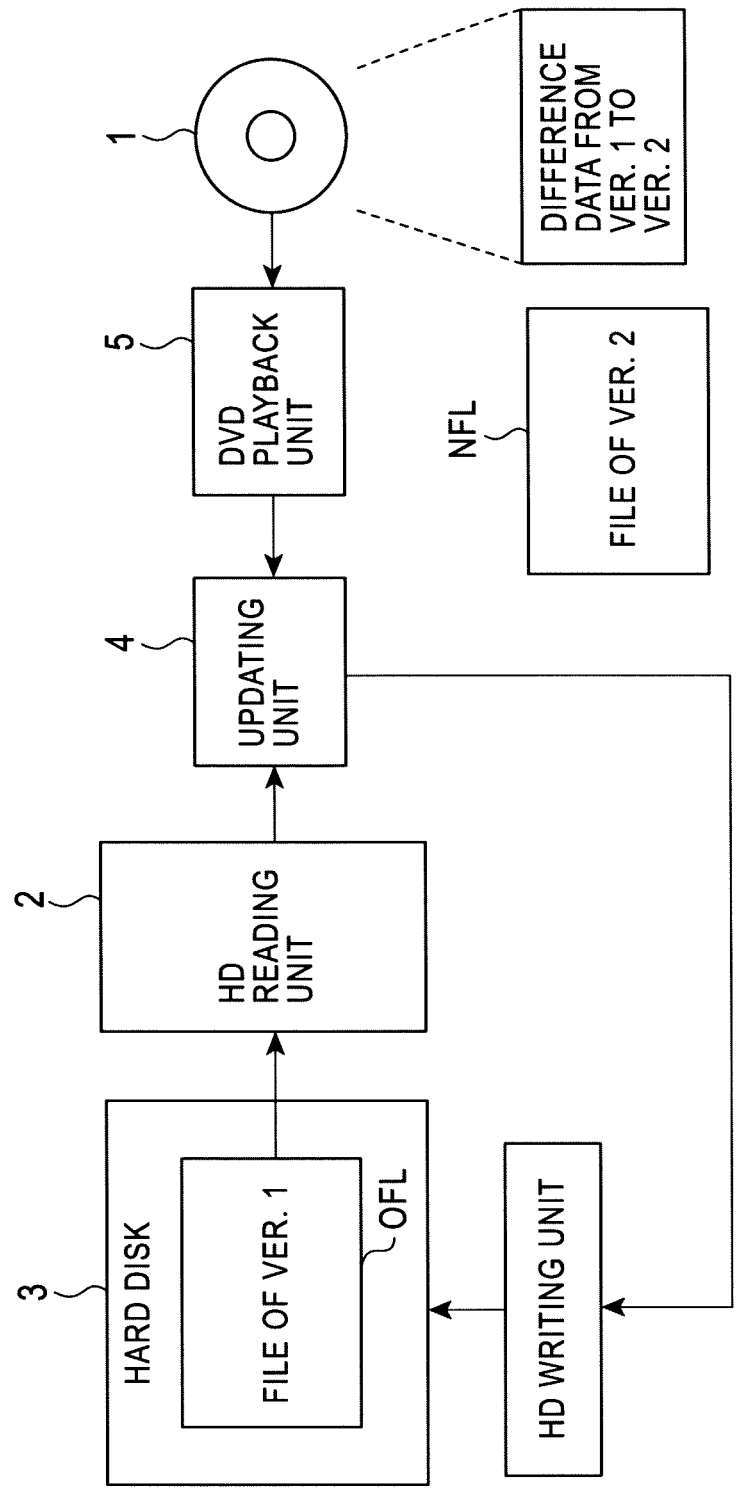
FIG. 21 is a block diagram showing an updating process (of the related art) of a navigation apparatus in which an updating DVD is used to update old map data on a hard disk to new map data.
Figure 22:
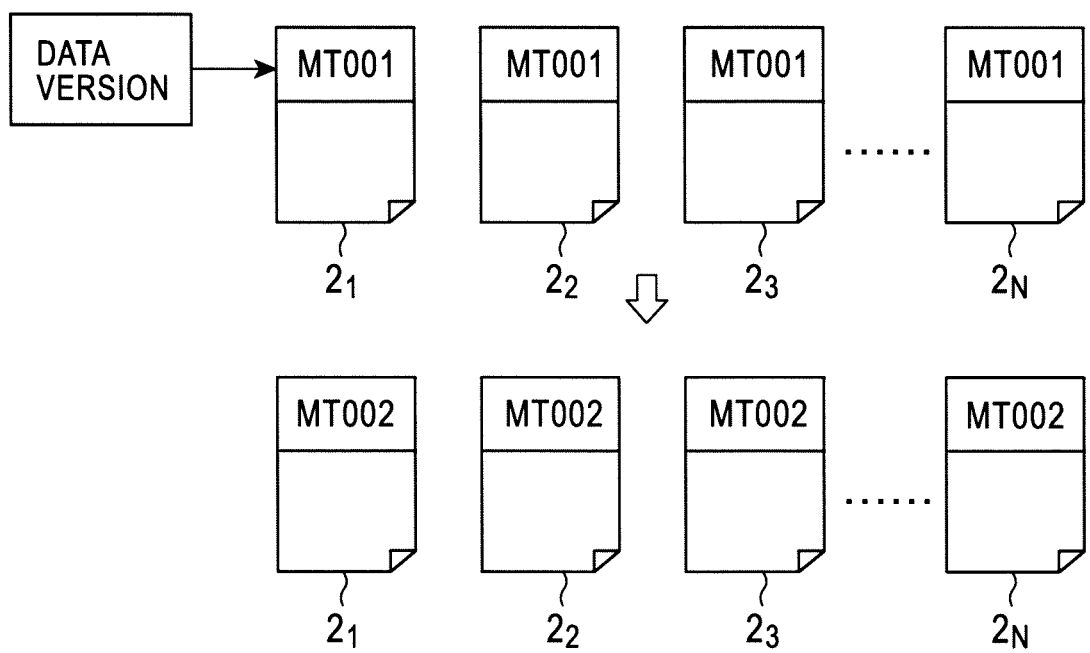
FIG. 22 is an illustration of a problem in determination (of the related art), based on a data version number, of whether a map file has already been updated.

FIG. 19 shows an example of a difference-updating-information record number and includes the following information:
(1) a processing state (whether a file to be updated have already been processed);
(2) the file name of a map-updating file to be updated;
(3) a flag indicating one of raw data updating and difference updating (indicating which of a new map file and difference data the map-updating file is based on);
(4) the file number of an updating-data-entity file;
(5) an offset from the start of the updating-data-entity file; and
(6) the size of updating data.

When the flag is on, it is indicated that an updating-entity file represented by the updating-data-entity file number is a new map file. When the flag is off, it is indicated that the updating-entity file is difference data.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A map-updating-data creating method for updating old map data to new map data in a navigation system configured to provide navigation guidance to a user, the old map data including a plurality of old map files, the map-updating-data creating method comprising:
for each old map file to be updated, creating a temporary map-updating file to be used for overwriting or rewriting the old map file to a new map file;
determining new serial numbers of updated map files in such a manner that previously assigned old serial numbers of non-updated map files are not changed and the new serial numbers sequentially follow the old serial numbers;
creating a serial number management file in which marks are respectively written at positions corresponding to the new and old serial numbers of all the map files, wherein a mark is written at a serial number position in the serial number management file after map file updating and an indication is issued that file updating has been performed, and wherein no mark is written at the serial number position before map file updating and an indication is issued that file updating has not been performed;
generating, by a map updating data processor, map-updating data while the navigation system simultaneously provides navigation guidance to the user, the map-dating data including the map-updating file and the serial number management file, wherein the new serial number is added to the map-updating file and an old map file is updated with the new serial number to a new map file; and
overwriting the old map file to the new map file based on the map-updating file and the serial number management file to provide an updated region of the map;
wherein said overwriting is performed in an entire updating mode by overwriting the old map file to the new map file in a sequential manner when navigation control is not performed based on a location corresponding to the old map file;
wherein the entire updating mode is interrupted and the overwriting is performed in an on-demand mode when navigation control is requested to perform guidance based on a location corresponding to the old map file; and
wherein the entire updating mode resumes when navigation control is no longer performed based on the location corresponding to the old map file, and navigation control is performed for the user based on the new map file.

2. The map updating method according to claim 1, wherein upon finishing creating a map-updating file for a predetermined map file:
creating the serial number management file including the steps of
deleting within the serial number management file, a first mark at a position corresponding to an old serial number of the predetermined map file; and
writing a second mark at a position corresponding to a new serial number of the predetermined map file.

3. The map updating method according to claim 2, wherein:
the serial number management file includes N bytes, and bit positions of bytes from a first byte to an N-th byte correspond to serial numbers; and
the second mark is written by writing a logical one at each bit position, and the first mark is deleted by writing a logical zero at the bit position.

4. A navigation apparatus for updating an old map file stored in a storage unit to a new map file by using map-updating data and provide navigation guidance to a user, the navigation apparatus comprising:
a storage unit operable to store old map data;
a reading/writing control unit operable to control reading of the old map data from the storage unit and writing new map data into the storage unit; and
a control unit operable configured to provide navigation guidance to the user and to simultaneously perform sequential map-data processing associated with updating a plurality of map files using map-updating data and configured to determine if a necessary map file required for navigation control contains up-to-date map data;
a serial number management file in which marks are respectively written at positions corresponding to new and old serial numbers of all the map files, wherein a mark is written at a serial number position in the serial number management file after map file updating and an indication is issued that file updating has been performed, and wherein no mark is written at the serial number position before map file updating and an indication is issued that file updating has not been performed;

wherein the new serial number is added to the map-updating file and an old map file is updated with the new serial number to a new map file;

wherein if the necessary map file contains up-to-date map data, then the necessary map file is used to execute navigation control;

wherein said rewriting or overwriting is performed in an entire updating mode by rewriting or overwriting the old map file to the new map file in a sequential manner when navigation control is not performed based on a location corresponding to the old map file;

wherein the entire updating mode is interrupted and the rewriting or overwriting is performed in an on-demand mode when navigation control is requested to perform guidance based on a location corresponding to the old map file; and wherein the entire updating mode resumes when navigation control is no longer performed based on the location corresponding to the old map file, and navigation control is performed for the user based on the new map file.

5. The navigation apparatus according to claim 4, comprising:
a map-updating-data generating unit operable to generate the map-updating data;
the control unit is operable to create a new map file using the map-updating data if the necessary map file does not contain up-to-date map data; and
a navigation control unit operable to perform navigation control using the new map file.

6. The navigation apparatus according to claim 4, wherein the control unit is operable to perform the sequential map-updating processing while not performing processing associated with navigation control.

7. The navigation apparatus according to claim 4, wherein, if the necessary map file does not contain up-to-date map data, the control unit updates the necessary map file using the map-updating data, and subsequently restarts the sequential map-updating processing in order.

8. The navigation apparatus according to claim 4, wherein:
the control unit includes a file storage unit which acquires and stores the map-updating data, the map-updating data including a serial number management file in which marks are respectively written at positions corresponding to the serial numbers of all map files obtained after the sequential map-updating processing finishes; and
the control unit is operable to assign a new serial number to an updated map file without changing a previously assigned serial number of a non-updated map file, and by checking if a mark is written at a position in the serial number management file which corresponds to the serial number of the necessary map file, determines if the necessary map file contains up-to-date map data.

9. The navigation apparatus according to claim 8, wherein the serial number management file includes N bytes, and the bit positions of bytes from a first byte to an N-th byte correspond to the serial numbers.

10. The navigation apparatus according to claim 4, further comprising a data unit operable to specify one of a plurality of geographical region and a predetermined location, and configured to prioritize updating a map file relating to one of the geographical region and a region within a predetermined range from the predetermined location.

11. A map-updating-data creating apparatus for creating map-updating data and provide navigation guidance to a user, the map-updating data being used to update old map data to new map data, the old map data including a plurality of old map files, the map-updating-data creating apparatus comprising:
a map file unit operable to transfer map files;
a processing unit operable to create, for each old map file to be updated, a map-updating file for rewriting or overwriting the old map file to a new map file, and to determine serial numbers of updated map files such that previously assigned old serial numbers of map files not being updated are not changed, and new serial numbers following the old serial numbers are assigned in ascending order to map files being updated, and to create a serial number management file, wherein a mark is written at a serial number position in the serial number management file after map file updating and an indication is issued that file updating has been performed, and wherein no mark is written at the serial number position before map file updating and an indication is issued that file updating has not been performed, and wherein the new serial number is added to the map-updating file and an old map file is updated with the new serial number to a new map file;
a map-updating-data unit operable to generate map-updating data to provide an updated region of the map,
wherein said rewriting or overwriting is performed in an entire updating mode by rewriting or overwriting the old map file to the new map file in a sequential manner when navigation control is not performed based on a location corresponding to the old map file;
wherein the entire updating mode is interrupted and the rewriting or overwriting is performed in an on-demand mode when navigation control is requested to perform guidance based on a location corresponding to the old map file; and
wherein the entire updating mode resumes when navigation control is no longer performed based on the location corresponding to the old map file, and navigation control is performed for the user based on the new map file.

12. The map-updating-data creating apparatus according to claim 11, further comprising a storage unit operable to store the serial number management file.

13. The map-updating-data creating apparatus according to claim 11, wherein when creating the serial number management file, the processing unit deletes a first mark in the serial number management file at one position corresponding to an old serial number of a map file being updated, and writes a second mark in the serial number management file at another position corresponding to a new serial number of the map file being updated.

14. The map-updating-data creating apparatus according to claim 13, wherein:
the serial number management file includes N bytes, and bit positions of bytes from a first byte to an N-th byte correspond to the serial numbers; and
the second mark is written by writing a logical one at a bit position and the first mark is deleted by writing a logical zero at the bit position.

15. A map-data updating method for updating old map data to new map data and provide navigation guidance to a user, the old map data including a plurality of old map files, the map-data updating method comprising:
for each old map file to be updated, creating a temporary map-updating file to be used for rewriting or overwriting the old map file to a new map file;

determining serial numbers of updated map files such that previously assigned old serial numbers of map files which are not updated are not changed, and new serial numbers which follow the previously assigned serial numbers are assigned in ascending order to map files which are updated;

creating a serial number management file in which marks are respectively written at positions corresponding to the serial numbers of map files received, wherein a mark is written at a serial number position in the serial number management file after map file updating and an indication is issued that file updating has been performed, and wherein no mark is written at the serial number position before map file updating and an indication is issued that file updating has not been performed;

generating map-updating data, by a map updating data processor, the map-updating data including the map-updating file and the serial number management file, wherein the new serial number is added to the map-updating file and an old map file is updated with the new serial number to a new map file;

using the map-updating data to perform sequential map-updating processing and simultaneously provide navigation guidance to the user; and determining if a necessary map file required for navigation control contains up-to-date map data by referring to the serial number management file;

wherein if the necessary map file contains up-to-date map data then the necessary map file is used to execute the navigation control, and alternatively, if the necessary map file does not contain up-to-date map data, then the necessary map file is updated or overwritten using the map-updating data to provide an updated region of the map;

wherein said rewriting or overwriting is performed in an entire updating mode by rewriting or overwriting the old map file to the new map file in a sequential manner when navigation control is not performed based on a location corresponding to the old map file;

wherein the entire updating mode is interrupted and the rewriting or overwriting is performed in an on-demand mode when navigation control is requested to perform guidance based on a location corresponding to the old map file; and wherein the entire updating mode resumes when navigation control is no longer performed based on the location corresponding to the old map file, and navigation control is performed for the user based on the new map file.

16. A map-data updating system for updating old map data to new map data and providing navigation guidance to a user, comprising;

a map-updating-data creating apparatus operable to create map-updating data for updating or overwriting old map data to new map data, the old map data including a plurality of old map files; and a navigation apparatus operable to perform map updating using the map-updating data and simultaneously providing navigation guidance to the user, wherein the map-updating-data creating apparatus comprises:

a map file unit operable to transfer old map files and new map files;

a processing unit operable to create, for each old map file to be updated, a map-updating file for rewriting or overwriting the old map file to a new map file, and to determine serial numbers of updated map files such that a previously assigned old serial numbers of map files not being updated are not changed, and new serial numbers sequentially following the old serial numbers are assigned to map files being updated, and to create a serial number management file in which marks are respectively written at positions corresponding to all the serial numbers; and a map-updating-data unit operable to generate map-updating data, the map-updating data including the map-updating file and the serial number management file, wherein a mark is written at a serial number position in the serial number management file after map file updating and an indication is issued that file updating has been performed, and wherein no mark is written at the serial number position before map file updating and an indication is issued that file updating has not been performed, and wherein the new serial number is added to the map-updating file and an old map file is updated with the new serial number to a new map file; and the navigation apparatus comprises:

a storage unit operable to store the old map data;

a reading/writing control unit operable to control reading of the old map data from the storage unit and writing of the new map data into the storage unit;

a map-updating-data input unit operable to transfer the map-updating data; and a control unit operable to perform map-updating processing by using the map-updating data, and to determine if a necessary map file required for navigation control contains up-to-date map data, wherein if the necessary map file contains up-to-date map data then the necessary map file is used to execute the navigation control, and if the necessary map file does not contain up-to-date map data then the map-updating data is used to update or overwrite the necessary map file to provide an updated region of the map;

wherein said rewriting or overwriting is performed in an entire updating mode by rewriting or overwriting the old map file to the new map file in a sequential manner when navigation control is not performed based on a location corresponding to the old map file;

wherein the entire updating mode is interrupted and the rewriting or overwriting is performed in an on-demand mode when navigation control is requested to perform guidance based on a location corresponding to the old map file; and wherein the entire updating mode resumes when the navigation guidance no longer provide guidance based on the location corresponding to the old map file, and navigation control is performed for the user based on the new map file.

* * * * *